United States Patent
Salem et al.

(10) Patent No.: US 9,843,984 B2
(45) Date of Patent: Dec. 12, 2017

(54) DYNAMIC ENERGY-EFFICIENT TRANSMIT POINT (TP) MUTING FOR VIRTUAL RADIO ACCESS NETWORK (V-RAN)

(71) Applicant: Huawei Technologies Co., Ltd., Shenzhen (CN)

(72) Inventors: Mohamed Adel Salem, Kanata (CA); Jianglei Ma, Ottawa (CA); Mohammadhadi Baligh, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 14/672,423

(22) Filed: Mar. 30, 2015

(65) Prior Publication Data

US 2015/0282045 A1 Oct. 1, 2015

Related U.S. Application Data

(60) Provisional application No. 61/972,839, filed on Mar. 31, 2014.

(51) Int. Cl.
*H04W 40/10* (2009.01)
*H04W 52/02* (2009.01)
(Continued)

(52) U.S. Cl.
CPC ........... *H04W 40/10* (2013.01); *H04W 28/08* (2013.01); *H04W 52/0206* (2013.01);
(Continued)

(58) Field of Classification Search
CPC ............... H04W 40/10; H04W 28/08; H04W 52/0206; H04W 16/14; H04W 74/0808; H04B 7/0697; Y02B 60/50
See application file for complete search history.

(56) References Cited

U.S. PATENT DOCUMENTS 7,295,812 B2 * 11/2007 Haapoja ............... H04B 1/1027
455/296
8,155,058 B2 4/2012 Iyer et al.
(Continued)

FOREIGN PATENT DOCUMENTS

CN 102946618 A 2/2013
CN 103379599 A 10/2013
(Continued)

OTHER PUBLICATIONS

Auer, G., et al., "How much energy is needed to run a wireless network?," IEEE Wireless Communications, vol. 18, No. 5, Oct. 2011, pp. 40-49.
(Continued)

*Primary Examiner* — Brian O'Connor
(74) *Attorney, Agent, or Firm* — Slater Matsil, LLP

(57) ABSTRACT

Operational and environmental efficiency in virtual radio access networks (VRANs) can be improved by offloading data traffic and/or control signaling between physical transmit points (TPs) of a virtual TP. This may allow one or more physical TPs of the virtual TP to be muted in the downlink or uplink direction, thereby reducing energy consumption. The offloading may be performed during relatively short time-intervals such that physical TP are muted for one or more transmission time intervals (TTIs) before being re-activated. The offloading may also be implemented over longer time-intervals in accordance with a traffic engineering (TE) policy. Further it is possible to re-activate a de-activated downlink transmitter of physical TP by monitoring wireless signals via an activated receiver of the physical TP.

25 Claims, 20 Drawing Sheets

| BASE STATION MODELS | POWER CONSUMPTION VALUE [W] | | |
|---|---|---|---|
| | A | B | C |
| R1-114336 MACRO | 450 | 260 | 150 |
| R1-114336 PICO | 97.7 | 96.2 | 62 |
| FUTURE MACRO BASED ON EARTH IMPROVEMENTS | 225 | 85 | 34 |
| FUTURE PICO BASED ON EARTH IMPROVEMENTS | 91 | 69 | 23 |

(51) Int. Cl.
*H04W 28/08* (2009.01)
*H04B 7/06* (2006.01)
*H04W 74/08* (2009.01)
*H04W 16/14* (2009.01)

(52) U.S. Cl.
CPC .......... *H04B 7/0697* (2013.01); *H04W 16/14* (2013.01); *H04W 74/0808* (2013.01); *Y02B 60/50* (2013.01)

(56) References Cited

U.S. PATENT DOCUMENTS

| | | |
|---|---|---|
| 2012/0028665 A1 | 2/2012 | Kwon et al. |
| 2012/0170455 A1* | 7/2012 | Iyer .................. H04W 48/06 370/230 |
| 2013/0294240 A1 | 11/2013 | Suni |
| 2014/0162631 A1 | 6/2014 | Wang |
| 2016/0142940 A1* | 5/2016 | Teo .................. H04W 28/08 370/235 |
| 2016/0286455 A1 | 9/2016 | Zhang et al. |

FOREIGN PATENT DOCUMENTS

| | | |
|---|---|---|
| KR | 20100088511 A | 8/2010 |
| KR | 20110129951 A | 12/2011 |
| WO | 2014204404 A1 | 12/2014 |

OTHER PUBLICATIONS

Chen, Y., et al., "Energy Saving: Scaling Network Energy Efficiency Faster than Traffic Growth," IEEE Wireless Communications and Networking Conference Workshops, Apr. 7-10, 2013, pp. 12-17.

Frenger, P., et al., "Reducing Energy Consumption in LTE with Cell DTX," 73rd IEEE Vehicular Technology Conference, May 15-18, 2011, pp. 1-5.

Hassibi, B., et al., "On the Sphere-Decoding Algorithm I. Expected Complexity," IEEE Transactions on Signal Processing, vol. 53, No. 8, Aug. 2005, pp. 2806-2818.

Huberman, S., et al., "MIMO Full-Duplex Precoding: A Joint Beamforming and Self-Interference Cancellation Structure," IEEE Transactions on Wireless Communications, vol. 14, No. 4, Apr. 2015, pp. 2205-2217.

Nakamura, T., "LTE Enhancements and Future Radio Access," The 5th Future of Wireless International Conference, NTT Docomo, Inc., Jul. 2013, 15 pages.

Oggier, F., "On the Optimality of the Golden Code," IEEE Information Theory Workshop, Oct. 22-26, 2006, pp. 468-472.

International Search Report and Written Opinion received in International Application No. PCT/CN2015/075443 dated May 29, 2015, 14 pages.

* cited by examiner

DYNAMIC ENERGY-EFFICIENT TRANSMIT POINT (TP) MUTING FOR VIRTUAL RADIO ACCESS NETWORK (V-RAN)

This patent application claims priority to U.S. Provisional Application No. 61/972,839, filed on Mar. 31, 2014 and entitled "Dynamic Energy-Efficient Transmit Point (TP) Muting for Virtual Radio Access Network (V-RAN)," which is hereby incorporated by reference herein as if reproduced in its entirety.

TECHNICAL FIELD

The present invention relates to green wireless communications, and, in particular embodiments, to techniques for dynamic energy-efficient transmit point muting for virtual radio access network (V-RAN).

BACKGROUND

Mobile network operators may often incur high operational expenses due to the power requirements of base stations. For example, base stations may typically consume as much as eighty percent of the energy required to operate a cellular network, and may constitute a significant portion of the cellular network's carbon footprint. One strategy for improving efficiency is referred to as transmit point (TP) muting, where base stations that are not serving UEs can be transitioned from an active mode to 'sleep' (dormant) mode. Techniques for implementing TP muting in wireless networks having high access point (AP) densities are desired.

SUMMARY OF THE INVENTION

Technical advantages are generally achieved, by embodiments of this disclosure which describe techniques for dynamic energy-efficient transmit point muting for virtual radio access network (V-RAN).

In accordance with an embodiment, a method for offloading traffic between physical transmit points (TPs) of a virtual TP in a wireless communications network is provided. In this example, the method comprises identifying a virtual TP serving a user equipment (UE). The virtual TP includes at least a first physical TP and a second physical TP. The first physical TP communicates one or both of data traffic and control signaling with the UE during a first period. The method further includes offloading at least one of the data traffic and the control signaling from the first physical TP to the second physical TP. The second physical TP communicates the at least one of the data traffic or the control signaling with the UE during a second period. An apparatus for performing this method is also provided.

In accordance with another embodiment, a method for muting physical TPs is provided. In this example, the method includes deactivating a downlink transmitter of a physical transmit point (TP) without deactivating the uplink receiver of the physical TP, monitoring uplink feedback signals via the uplink receiver while the downlink transmitter of the physical TP is deactivated, and reactivating the downlink transmitter of the physical TP when the uplink feedback signal satisfies a downlink re-activation criteria.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
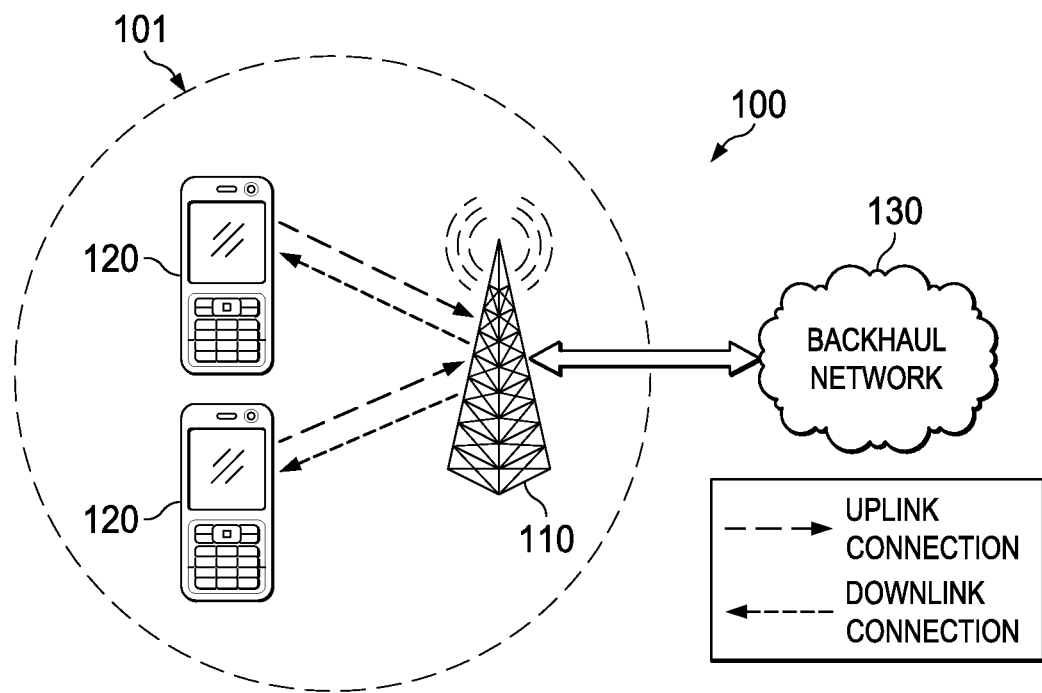
FIG. 1 illustrates a diagram of an embodiment wireless communications network.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Base stations may consume as much as eighty percent of the energy required to operate a cellular network. For example, a power amplifier in macro base stations may be responsible for between approximately fifty-five and sixty percent of the macro base station's power consumption, while the power amplifier in low power nodes may be responsible for approximately thirty percent of their power consumption. Accordingly, it may be possible to substantially reduce power consumption by dynamically deactivating a base station's downlink transmitter when the base station is idle in the downlink. Likewise, power consumption may also be reduced by deactivating an uplink receiver of a base station when the base station is idle in the uplink. Since power consumption increases operating costs and environmental emissions, traffic engineering techniques for efficiently muting base stations are desired Aspects of this disclosure improve operation and environmental efficiency in virtual radio access networks (VRANs) by offloading data traffic and/or control signaling between physical transmit points (TPs) of a virtual TP. This may allow one or more physical TPs of the virtual TP to be muted in the downlink or uplink direction, thereby reducing energy consumption. In particular, offloading traffic/signaling from a first physical TP to a second physical TP may allow the first physical TP to be dynamically muted. Additionally, offloading traffic/signaling from a first physical TP to a second physical TP may be part of a broader plan/strategy to uplink and/or downlink mute a third physical TP. The plan/strategy may be implemented dynamically such that offloading is performed during relatively short time-intervals, e.g., physical TP is muted for one or more transmission time intervals (TTIs) before being re-activated, etc. The plan/strategy may also be implemented over a longer term in accordance with a traffic engineering (TE) policy, e.g., physical TP is muted for several minutes or hours, etc. For instance, transferring traffic/signaling between low power nodes may be part of a broader TE strategy to offload control signaling from a macro base station. The offloading of data traffic and/or control information may be transparent to the served UE, who may view a group of physical TPs as a single virtual TP. In some embodiments, different physical TPs of a virtual TP are assigned to communicate data traffic and control information. For example, one physical TP may be assigned to communicate downlink data traffic to the served UE, while another physical TP may be assigned to communicate downlink control signaling to the UE. Moreover, offloading of the control signaling may be performed independently from the data traffic, and vice versa. For example, assume that a first physical TP is communicating data traffic with a served UE during a first period, and a second physical TP is communicating control signaling with the served UE during the first period. If the data traffic is offloaded from the first physical TP to a third physical TP, then it may be possible to reduce power consumption at the first physical TP by downlink (or uplink) muting the first physical TP during a second period. Likewise, if the control signaling is offloaded from the second physical TP to a third physical TP, then it may be possible to reduce power consumption at the second physical TP through selective muting. Aspects of this disclosure also provide a wake-up technique for re-activating a downlink transmitter of a physical TP based on signals monitored by an uplink receiver of the physical TP. These and other aspects are explained in greater detail below.

FIG. 1 illustrates a network 100 for communicating data. The network 100 comprises an access point (AP) 110 having a coverage area 101, a plurality of mobile devices 120, and a backhaul network 130. The AP 110 may comprise any component capable of providing wireless access by, inter alia, establishing uplink (dashed line) and/or downlink (dotted line) connections with the mobile devices 120, such as a base station, an enhanced base station (eNB), a femtocell, and other wirelessly enabled devices. The mobile devices 120 may comprise any component capable of establishing a wireless connection with the AP 110, such as a user equipment (UE), a mobile station (STA), or other wirelessly enabled devices. The backhaul network 130 may be any component or collection of components that allow data to be exchanged between the AP 110 and a remote end (not shown). In some embodiments, the network 100 may comprise various other wireless devices, such as relays, low power nodes, etc.

Aspects of this disclosure dynamically offload data traffic and/or control signaling of a UE between physical TPs of a virtual TP to reduce power consumption and/or environmental emissions in the corresponding VRAN. FIGS. 2A-2D illustrate an embodiment network 200 for offloading data between physical TPs of a virtual TP. As shown, the embodiment network 200 includes a virtual TP 210 composed of a plurality of physical TP 212, 214, 216, and a controller 230. The physical TPs 212, 214, 216 are adapted to provide wireless access in a coverage area 201 of the virtual TP 210. The controller 230 may be any component configured to make scheduling and/or offloading decisions for the virtual TP 210. The controller 230 may be co-located with one of the physical TPs 212, 214, 216. Alternatively, the controller 230 may be a central controller that is separate and distinct from the physical TPs 212, 214, 216.

Figure 2A:
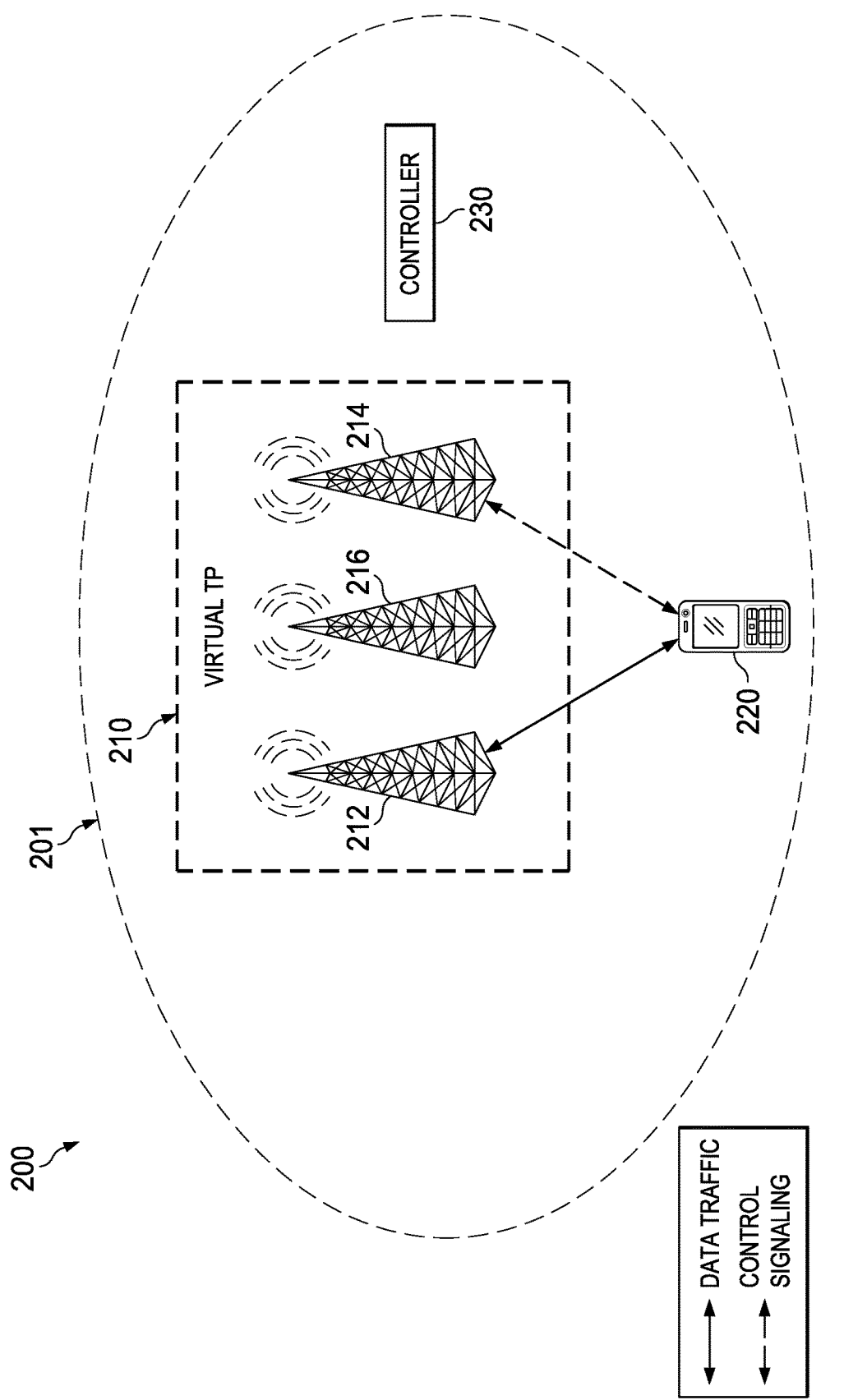
FIGS. 2A-2D illustrate diagrams of an embodiment virtual radio access network (VRAN) for offloading data traffic and/or control signaling.

As illustrated in FIG. 2A, the physical TP 212 is communicating data traffic (solid line) with a UE 220 during an initial period, and the physical TP 214 is communicating control signaling (dashed line) with the served UE 220 during the initial period. The data traffic and control signaling may be communicated in the downlink direction and/or the uplink direction. In one example, both the data traffic and the control signaling are communicated in the downlink direction. In another example, both the data traffic and the control signaling are communicated in the uplink direction. In other examples, the data traffic is communicated in the downlink direction and the control signaling is communicated in the uplink direction, or vice versa.

The data traffic and/or the control signaling may be exchanged between physical TPs of the virtual TP 210. In an example depicted in FIG. 2B, the data traffic is offloaded from the physical TP 212 to the physical TP 216 between the initial period and a subsequent period. In such an example, the physical TP 216 communicates the data traffic with the served UE 220 during the subsequent period, and the physical TP 214 communicates control signaling with the served UE 220 during the subsequent period. The data traffic offloaded from the physical TP 212 may be downlink data traffic or uplink data traffic.

When the offloaded data traffic is downlink data traffic, the physical TP 212 may be downlink muted during the subsequent period if the physical TP 212 does not have additional downlink transmission responsibilities during the subsequent period. Downlink muting may include deactivating downlink baseband circuitry of a downlink transmitter in the physical TP 212, deactivating a downlink radio frequency (RF) chain of the physical TP 212, or both. The downlink baseband circuitry may include any components for performing processing tasks on a baseband signal prior to up-converting the baseband signal to an RF signal. The downlink RF chain may include any components for up-converting the baseband signal to an RF signal (e.g., up-converter, etc.), as well as any components for amplifying or otherwise processing the RF signal prior to downlink transmission (e.g., power-amplifier, beamforming circuitry, etc.).

When the offloaded data traffic is uplink data traffic, then the physical TP 212 may be uplink muted during the subsequent period if the physical TP 212 does not have additional uplink reception responsibilities during the subsequent period. Uplink muting may include deactivating uplink baseband circuitry of a downlink transmitter in the physical TP 212, deactivating an uplink RF chain of the physical TP 212, or both. The uplink RF chain may include any components for receiving and/or processing an uplink RF signal (e.g., low noise amplifier, etc.), as well as any components for down-converting the RF signal to a baseband signal (e.g., down converter, etc.). The uplink baseband circuitry may include any components for performing processing tasks on a baseband signal produced from down-converting the uplink RF signal.

Figure 2B:
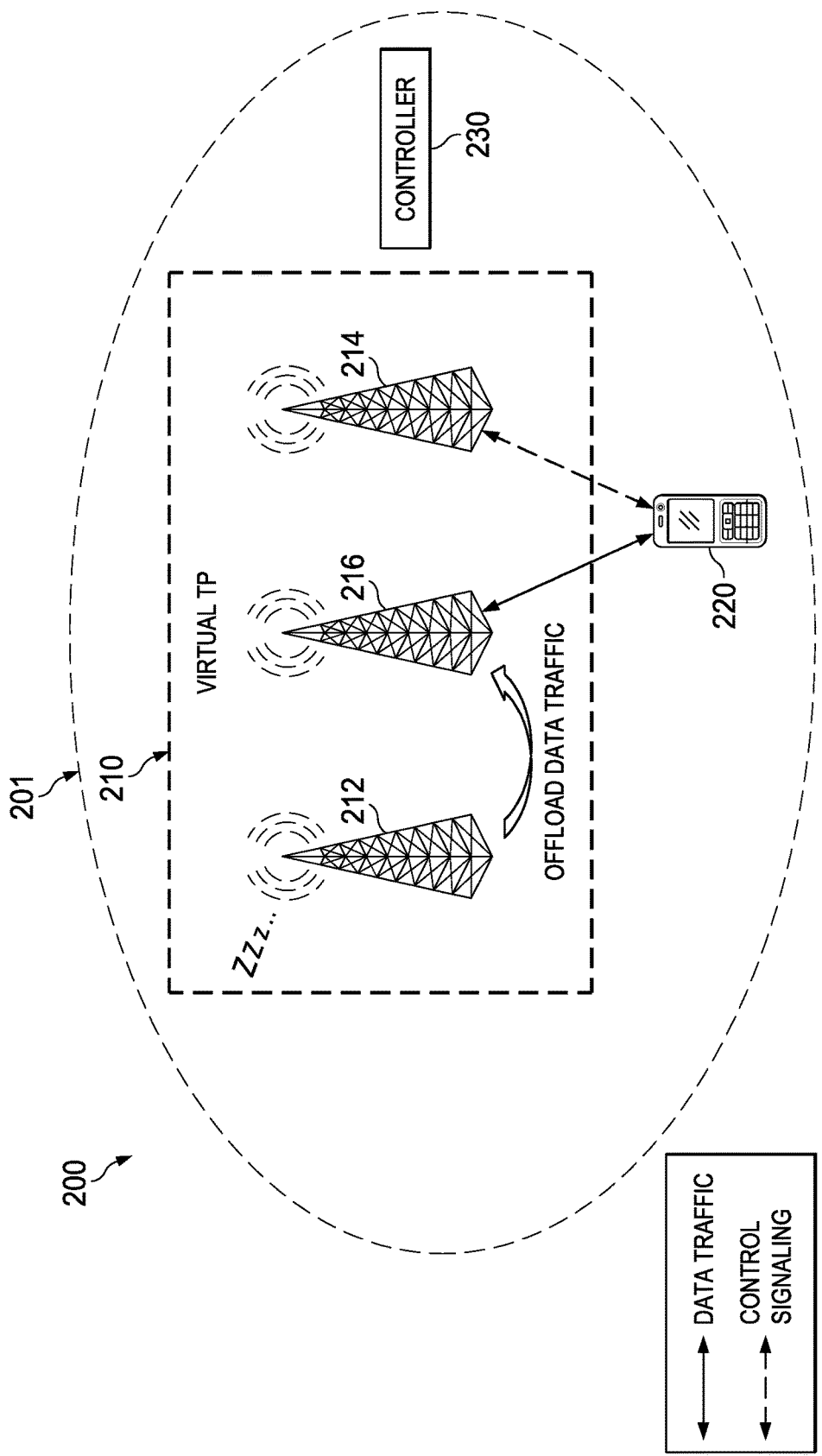
Figure 2C:
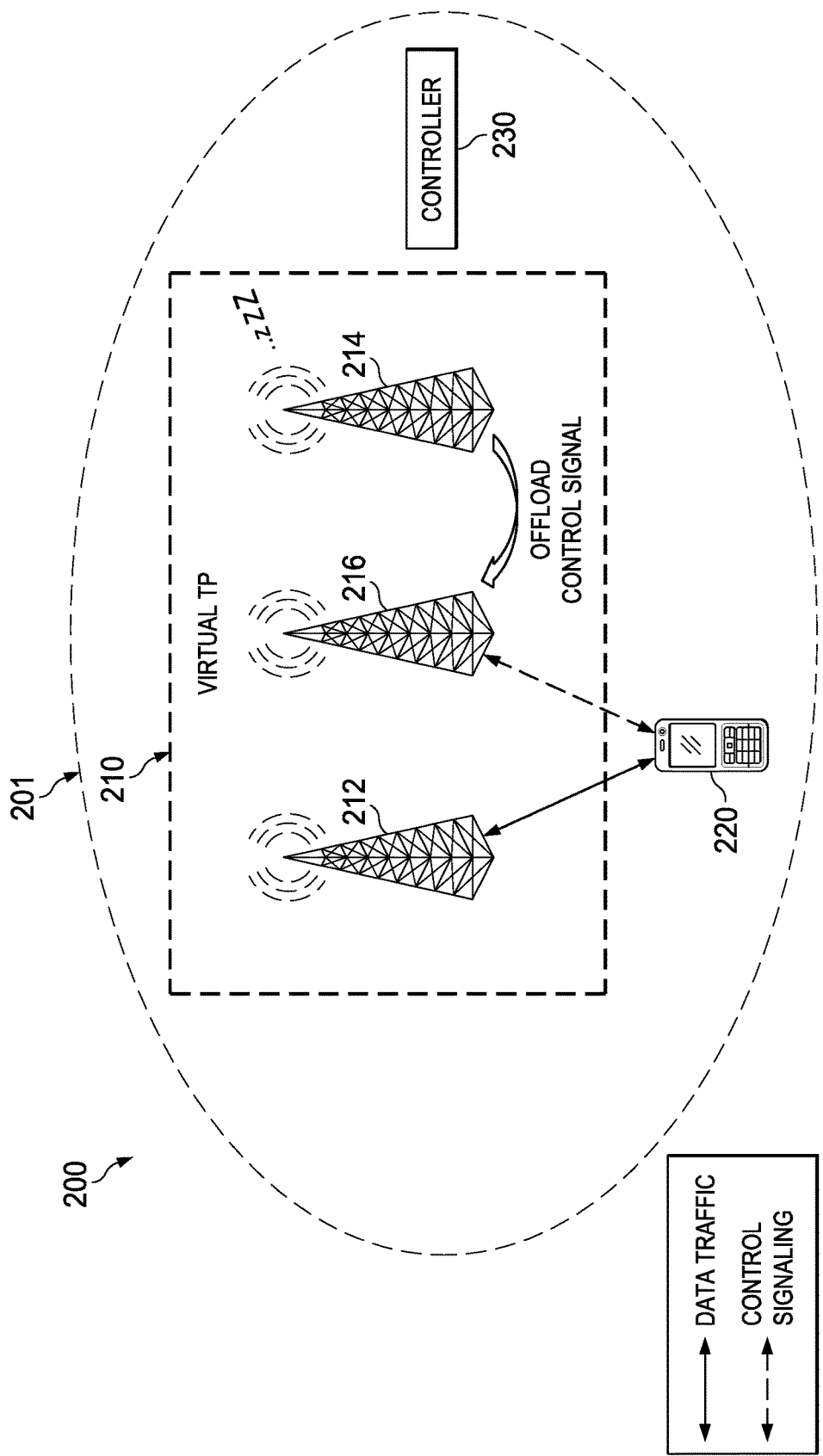

In another example depicted in FIG. 2C, the control signaling is offloaded from the physical TP 214 to the physical TP 216 between the initial period and a subsequent period. In such an example, the physical TP 212 communicates the data traffic with the served UE 220 during the subsequent period, and the physical TP 216 communicates control signaling with the served UE 220 during the subsequent period.

The control signaling offloaded from the physical TP 214 may be downlink control signaling or uplink control signaling. In some embodiments, the control signaling is user-specific control signaling. If the offloaded control signaling is downlink control signaling, then the physical TP 214 may be downlink muted during the subsequent period if the physical TP 214 does not have additional downlink transmission responsibilities. Alternatively, if the offloaded control signaling is uplink control signaling, then the physical TP 214 may be uplink muted during the subsequent period if the physical TP 214 does not have additional uplink reception responsibilities.

Figure 2D:
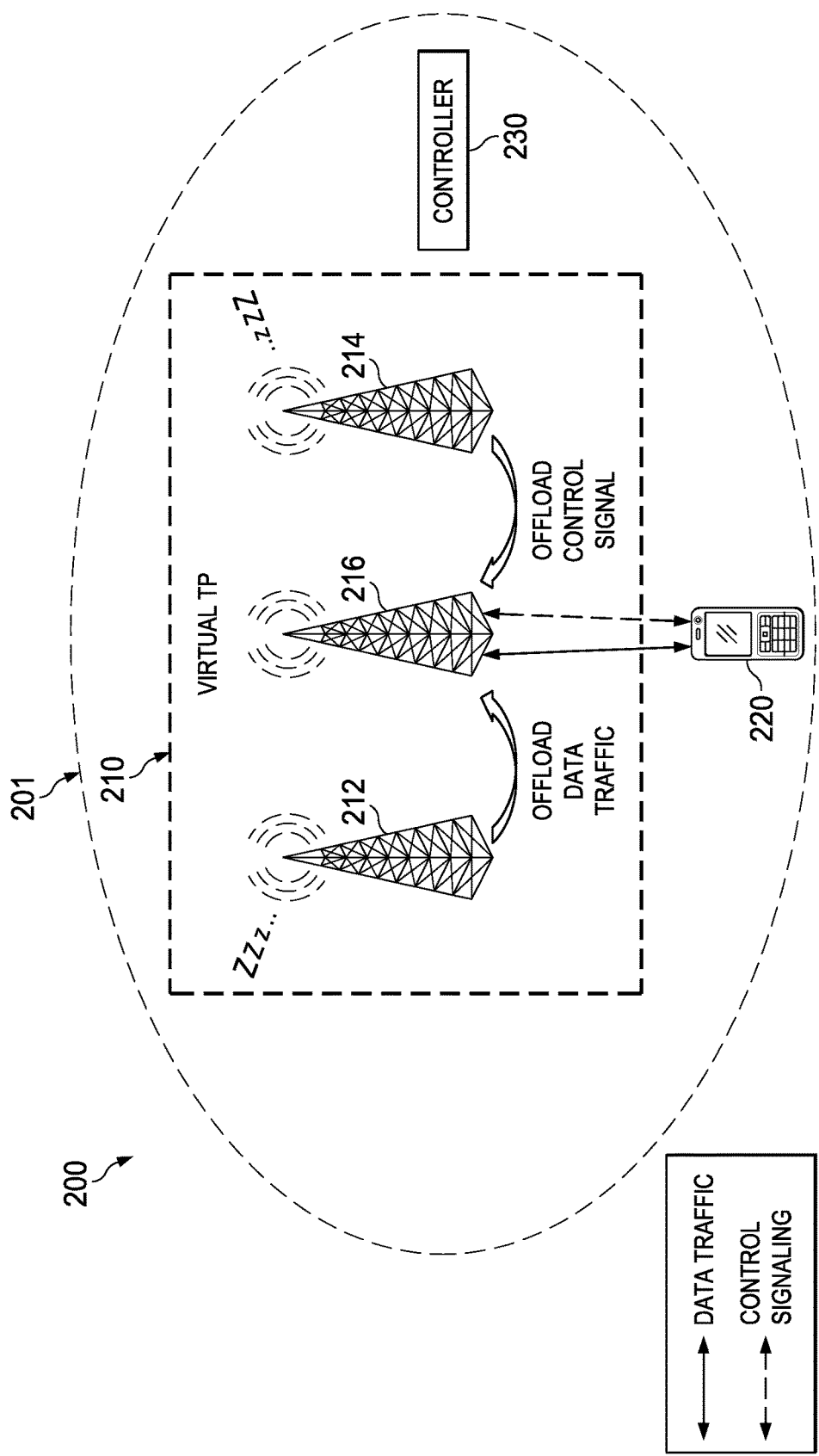

In yet another embodiment depicted by FIG. 2D, both the data traffic and the control signaling are offloaded to the physical TP 216 from the physical TP 212 and the physical TP 214, respectively. One or both of the physical TP 212 and the physical TP 214 may be downlink and/or uplink muted during the subsequent period if they do not have additional transmission/reception responsibilities. It should be noted that the offloading techniques depicted in FIGS. 2B-2D can be performed without causing the UE 220 to undertake a handover.

It should be appreciated that the offloading examples demonstrated in FIGS. 2B-2D represent just some embodiments provided by this disclosure, and that other offloading strategies may be employed to, for example, reduce power consumption in a wireless network. In some embodiments, a single physical TP (e.g., a first physical TP) may communicate data traffic and control signaling to a UE during the initial period, and one or both of the data traffic and control signaling can be offloaded to another physical TP (e.g., a second physical TP) between the initial period and the subsequent period. For example, data traffic may be offloaded from the first physical TP to the second physical TP without offloading the control signaling. As a result, the first physical TP may communicate the control signaling to the UE during the subsequent interval, while the second physical TP may communicate the data traffic to the UE during the subsequent interval. As another example, control signaling may be offloaded from the first physical TP to the second physical TP without offloading the data traffic. As a result, the first physical TP may communicate the data traffic to the UE during the subsequent interval, while the second physical TP may communicate the control signaling to the UE during the subsequent interval. As yet another example, both the data traffic and the control signaling may be offloaded from the first physical TP to the second physical TP. As a result, the second physical TP may communicate both the data traffic and the control signaling to the UE during the subsequent interval. As yet another example, data traffic may be offloaded from the first physical TP to the second physical TP, while control signaling may be offloaded from the first physical TP to a third physical TP. As a result, the second physical TP may communicate the data traffic to the UE during the subsequent interval, while the third physical TP may communicate the control signaling to the UE during the subsequent interval. Other embodiments are also possible, e.g., data traffic could be offloaded from a first physical TP to a second physical TP, while control signaling is offloaded from a third physical TP to a fourth physical TP.

It should also be appreciated that offloading data traffic and/or control signaling from a first physical TP to a second physical TP may be part of a larger TE scheme to achieve downlink or uplink muting of a third physical TP. For example, data traffic and/or control signaling may be offloaded from a first low power node to a second low power node so that the first low power node has the capacity to undertake offloaded traffic/signaling from a macro base station. This may allow the macro base station to be uplink or downlink muted during a subsequent period.

Figure 3:
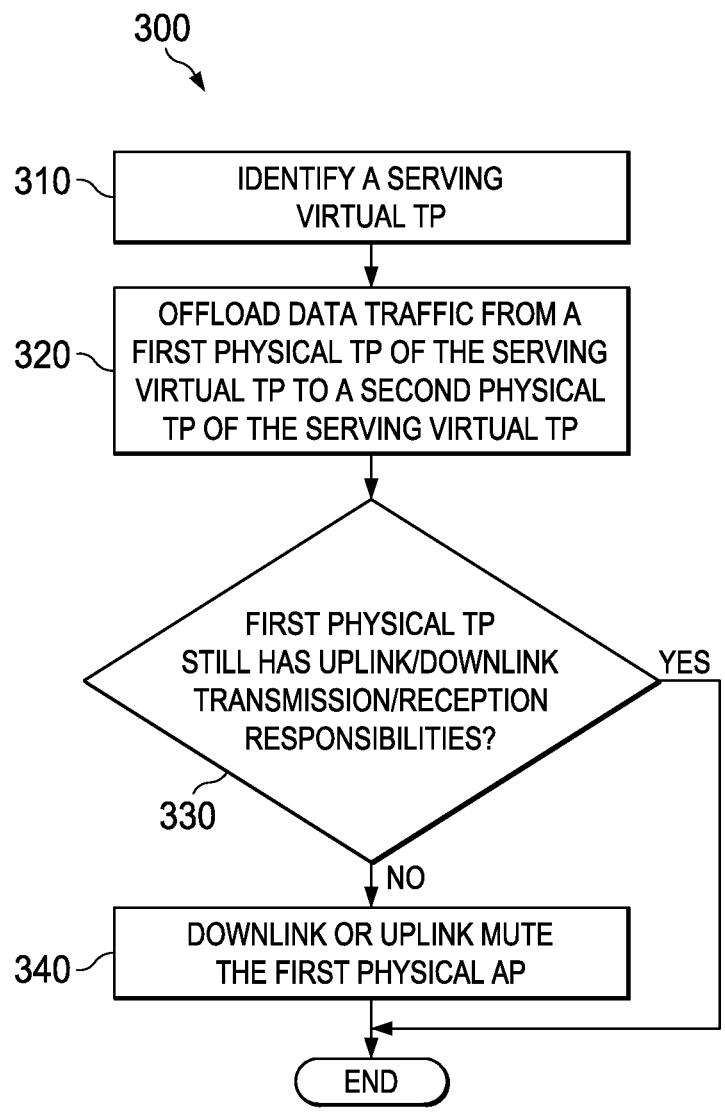
FIG. 3 illustrates a diagram of an embodiment method for offloading data traffic between physical access points (APs) of a virtual AP.

FIG. 3 illustrates an embodiment method 300 for offloading data traffic between physical TPs of a virtual TP, as might be performed by a controller. As shown, the method begins at step 310, where the controller identifies a virtual TP.

Thereafter, the method 300 proceeds to step 320, where the controller offloads data traffic from a first physical TP of the serving virtual TP to a second physical TP of the serving virtual TP. Offloading the data traffic may be accomplished by communicating instructions to one or both of the physical transmit points. In some embodiments, the controller considers muting the first physical TP after the data traffic has been offloaded. In such embodiments, the method 300 proceeds to step 330, wherein controller determines whether the first physical TP still has uplink/downlink transmission/reception responsibilities. If not, the method 300 proceeds to step 340, where the controller downlink or uplink mutes the first physical AP. This may be performed by communicating instructions to the first physical AP. It should be noted, that uplink data traffic and/or downlink data traffic may be offloaded from one physical AP to another. For example, a controller may identify a physical AP having data traffic that can be offloaded, and then offload uplink data traffic, downlink data traffic, or both from the identified physical AP to another physical AP. In one embodiment, the controller offloads one of uplink (UL) data traffic and downlink (DL) data traffic from the identified physical TP to another TP without offloading the other one of the UL traffic and the DL traffic. In another embodiment, the controller offloads both uplink (UL) data traffic and downlink (DL) data traffic from the third physical TP to another TP.

In some embodiments, a controller may select a virtual TP for strategic offloading between physical TPs of the virtual TP based on a policy or objective. For instance, the controller may select, from a plurality of virtual TPs in a wireless network, one or more of the virtual TPs for strategic offloading to achieve a specific objective, such as to reduce the overall power consumption or emissions of the wireless network. In one example, the controller may select the virtual TP(s) in accordance with a traffic level of the virtual TP(s). The traffic level may correspond to an amount of traffic being communicated by the physical TPs of the virtual TP. For example, virtual TPs that have low traffic levels and/or low amounts of available bandwidth may be better suited for strategic offloading, as the controller may have more flexibility to offload traffic between physical TPs, thereby allowing the controller to dynamically mute a higher number and/or ratio of physical TPs of the corresponding virtual TPs. Hence, the controller may compare traffic levels of virtual TPs when selecting a virtual TP for strategic offloading. In another example, the controller may select the virtual TP(s) for strategic offloading in accordance with a power consumption of the virtual TP(s). For instance, the controller may be better able to reduce power consumption in a wireless network by selecting virtual TPs having high power consumptions for strategic offloading, as virtual TPs having high power consumptions may experience greater energy savings from the strategic offloading.

Figure 4:
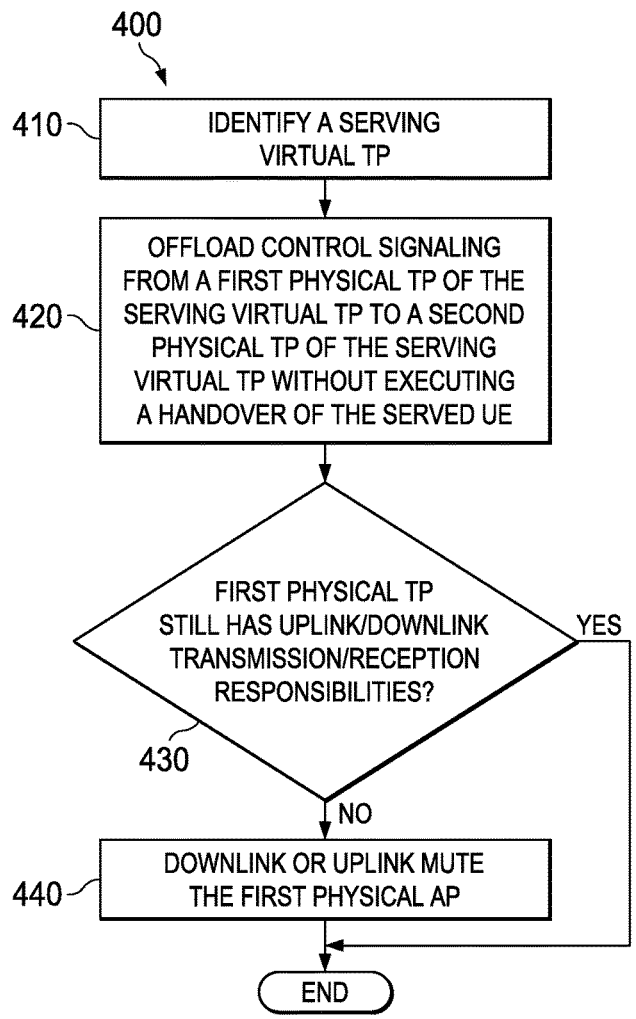
FIG. 4 illustrates a diagram of an embodiment method for offloading control signaling between physical access points (APs) of a virtual AP.

FIG. 4 illustrates an embodiment method 400 for offloading control signaling between physical TPs of a virtual TP, as might be performed by a controller. As shown, the method begins at step 410, where the controller identifies a virtual TP. Thereafter, the method 400 proceeds to step 420, where the controller offloads control signaling from a first physical TP of the serving virtual TP to a second physical TP of the serving virtual TP. Offloading the control signaling may be accomplished by communicating instructions to one or both of the physical transmit points. In some embodiments, the controller considers muting the first physical TP after the control signaling has been offloaded. In such embodiments, the method 400 proceeds to step 430, wherein controller determines whether the first physical TP still has uplink/downlink transmission/reception responsibilities. If not, the method 400 proceeds to step 440, where the controller downlink or uplink mutes the first physical AP. This may be performed by communicating instructions to the first physical AP.

Aspects of this disclosure also provide wake-up techniques for dynamically re-activating a downlink transmitter based on uplink feedback. More specifically, a physical TP that is downlink muted may monitor signals via an activated uplink receiver, and re-activate the downlink transmitter when a monitored signal satisfies a downlink re-activation criteria. The monitored signals may include uplink signals associated with UEs or relay. For example, the signal may be an uplink signal transmitted directly by a target UE. As another example, the signal may be an uplink signal indicating a parameter or instruction associated with a target UE. The uplink signal may be communicated by the target UE, by a relay, or by a helping UE engaged in device-to-device (D2D) communications with the target UE. In an embodiment, the uplink signal comprises an uplink feedback signal that indicates an interference level experienced by a target UE. In such an embodiment, the downlink re-activation criteria may be satisfied when the uplink signal indicates that the interference level experienced by the target UE exceeds a threshold. The interference level indicated by the feedback signal may be a background interference level experienced by the target UE. In another embodiment, the uplink signal comprises a request or indication to provide wireless access to a target UE. For example, the uplink signal may comprise a discovery signal (e.g., an uplink sounding signal), and the downlink re-activation criteria may be satisfied when a quality (e.g., received signal power, etc.) of the discovery signal exceeds a threshold. As yet another example, the uplink signal may comprise a request for service (e.g., a handover or link establishment request). The monitored signals may also include signals communicated by other network devices, such as a wakeup signal communicated by a controller or another physical TP. The physical TP may also receive a wake-up indication from a controller or neighboring TP over a backhaul link.

Notably, a controller may know, or be able to estimate, how much downlink interference the UE will experience as a result of downlink transmissions by physical TPs being managed by the controller. Background interference may include interference or noise observed at the UE that exceeds the cumulative downlink interference from downlink transmissions of physical TPs being managed by the controller. The excess interference may come from various sources, such as TPs not being managed by the controller, other UEs, etc.

Figure 5:
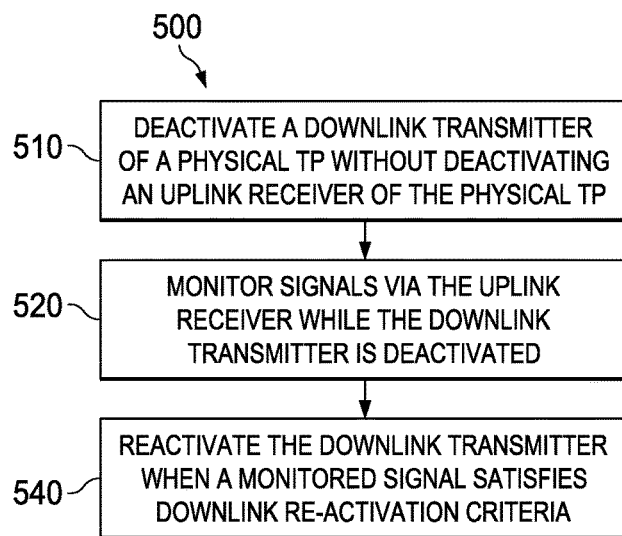
FIG. 5 illustrates a diagram of an embodiment method for re-activating a downlink transmitter based on uplink feedback information.

FIG. 5 illustrates an embodiment method for dynamically re-activating a downlink transmitter based on uplink feedback, as may be performed by a physical TP. As shown, the method 500 begins with step 510, where the physical TP deactivates a downlink transmitter of the physical TP without deactivating an uplink receiver of the physical TP. The deactivation may be a partial or full deactivation. For example, the physical TP may deactivate a downlink baseband circuitry of the downlink transmitter without deactivating a downlink radio frequency (RF) chain of the downlink transmitter. As another example, the physical TP may deactivate the downlink RF chain of the downlink transmitter without deactivating the downlink baseband circuitry of the of the downlink transmitter. As yet another example, the physical TP may deactivate both the downlink baseband circuitry and the downlink RF chain of the downlink transmitter. Next, the method 500 proceeds to step 520, where the physical TP monitors signals using the uplink receiver while the downlink transmitter is deactivated. The signals may be uplink signals transmitted by a target or helping UE. Alternatively, the signals may be re-activation signals communicated by another TP. Subsequently, the method 500 proceeds to step 530, where the physical TP reactivates the downlink transmitter when a monitored signal satisfies a downlink re-activation criteria.

Embodiments of this disclosure may provide greater flexibility than conventional techniques, as well as providing increased independency between downlink and uplink operations. Combined data and control offloading and techniques for efficiently transitioning transmit points from idle to active modes may provide flexibility, cost savings and performance gains.

Figure 6:
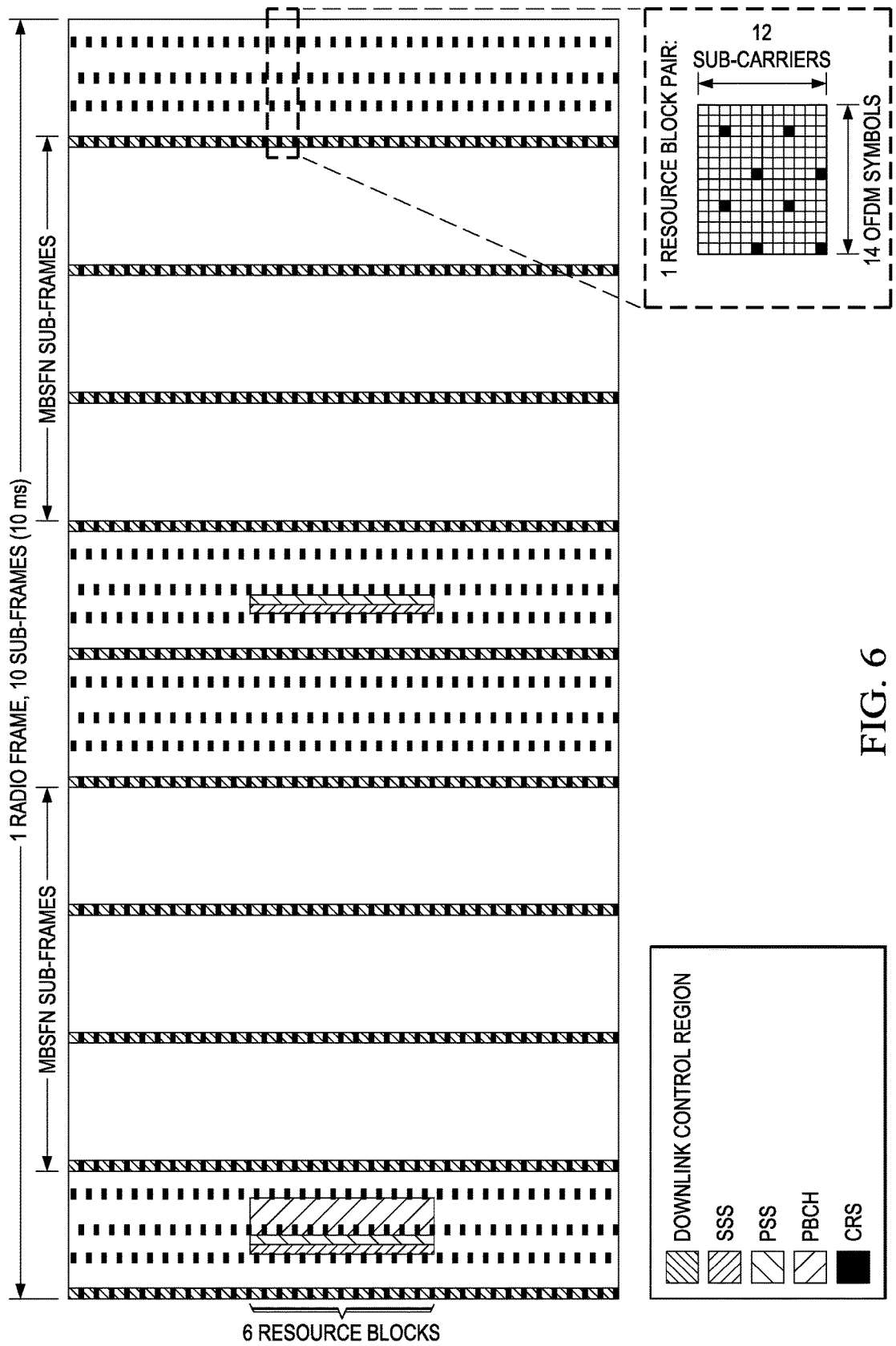
FIG. 6 illustrates a diagram of an embodiment Multicast-broadcast single-frequency network (MBSFN) frame structure.

FIG. 6 illustrates a Multicast-broadcast single-frequency network (MBSFN) frame structure of conventional DTX schemes. As shown, transmissions are muted in a portion of (e.g., six of ten) MSBFN subframes in a radio-frames to reduce base station power consumption. Details of the DTX scheme are discussed in the Vehicular Technology Conference (VTC) article entitled "Reducing Energy Consumption in LTE with Cell DTX," (2011 IEEE 73rd, vol. 1, no. 5, pp. 15-18, May 2011), which is incorporated by reference herein as if reproduced in its entirety.

Figure 7:
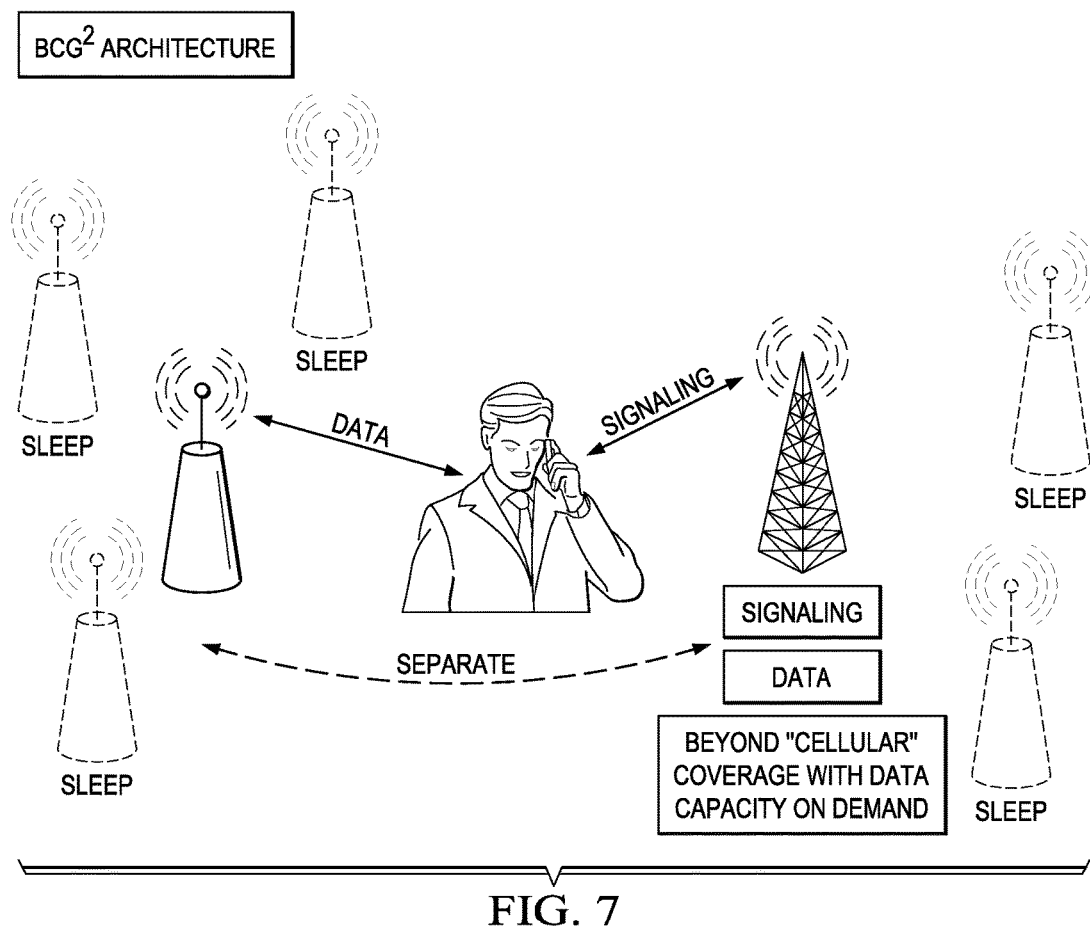
FIG. 7 illustrates a diagram of a conventional Beyond Cellular Green Generation (BCG2) network architecture.

FIG. 7 illustrates a Beyond Cellular Green Generation (BCG2) network architecture in which the network is split into a data-only network, where data transmit points can be activated on demand, and a control-only network where control transmit points are always on. The BCG2 architecture is explained in greater detail by Wireless Communications and Networking Conference Workshops (WCNCW) publication entitled "Energy saving: Scaling network energy efficiency faster than traffic growth," (2013 IEEE WCNCW, vol. 12, no. 17, pp. 7-10 Apr. 2013), which is incorporated by reference herein as if reproduced in its entirety.

Figure 8:
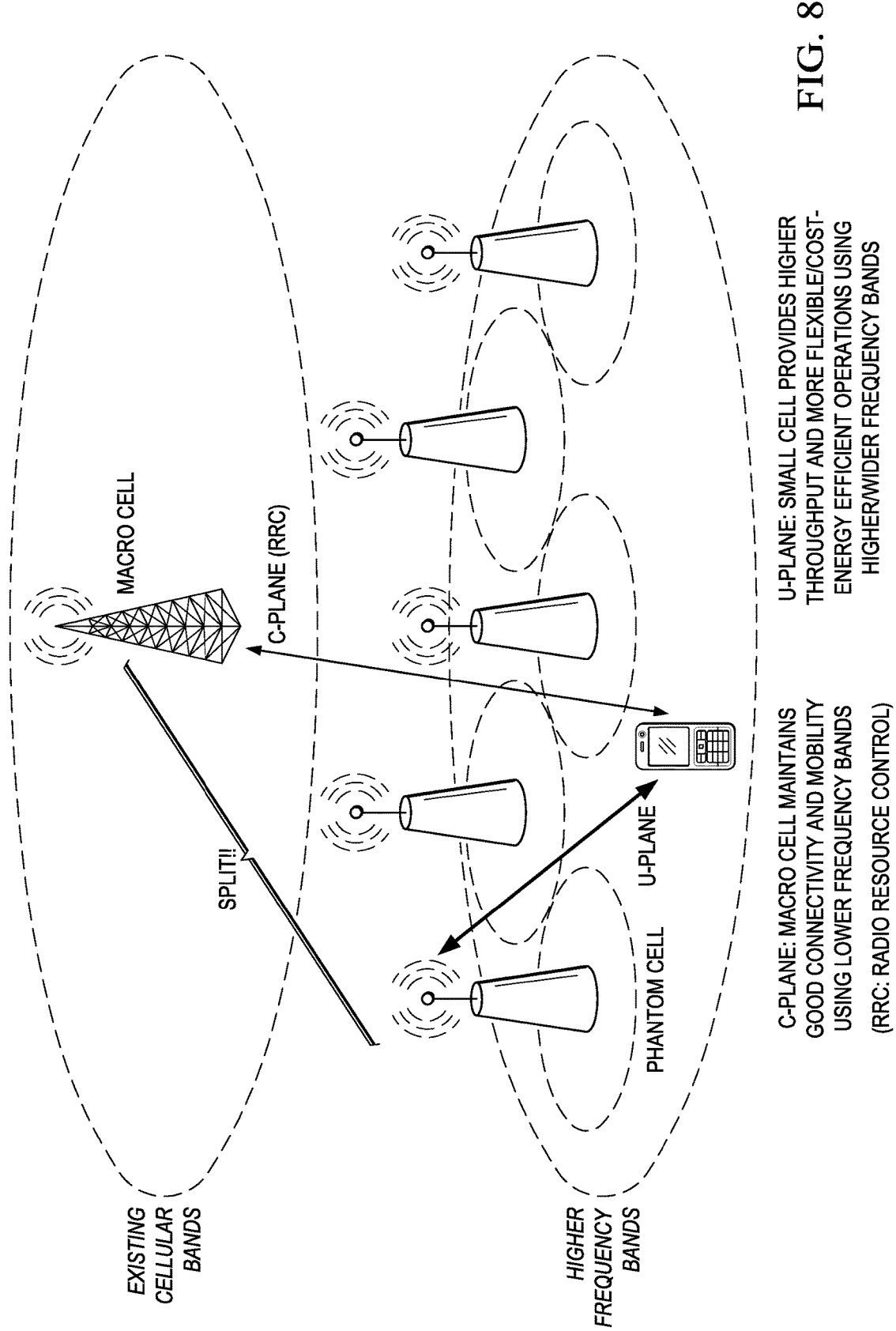
FIG. 8 illustrates a diagram of a conventional phantom cell network architecture.

FIG. 8 illustrates a phantom cell network architecture for a macro-assisted small cell in which the C-plane and U-plane are split between the macro and small cell in different frequency bands. The phantom cell network architecture is explained in greater detail by paper entitled "RAN Evolution Beyond Release 12," (LTE World Summit, 2013), which is incorporated by reference herein as if reproduced in its entirety.

Figure 9A:
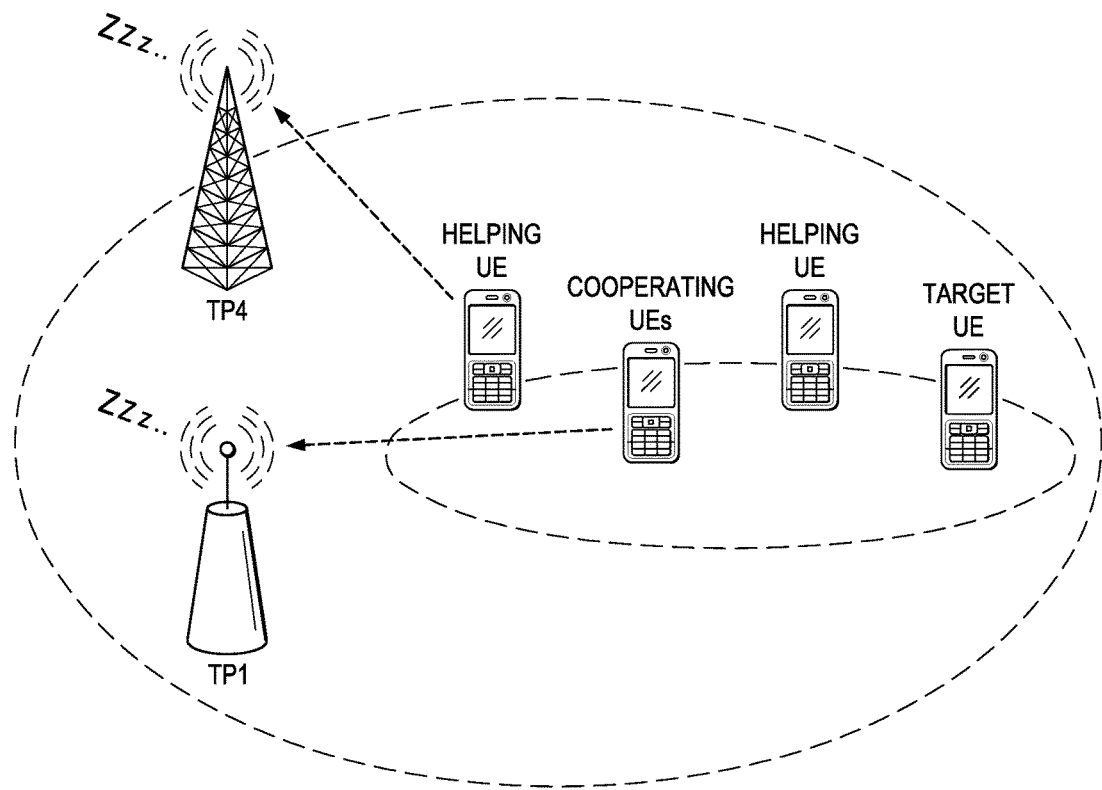
FIGS. 9A-9C illustrate network configurations for transmit point muting and DPS scheduling that leverage device-to-device (D2D) communications.
Figure 9B:
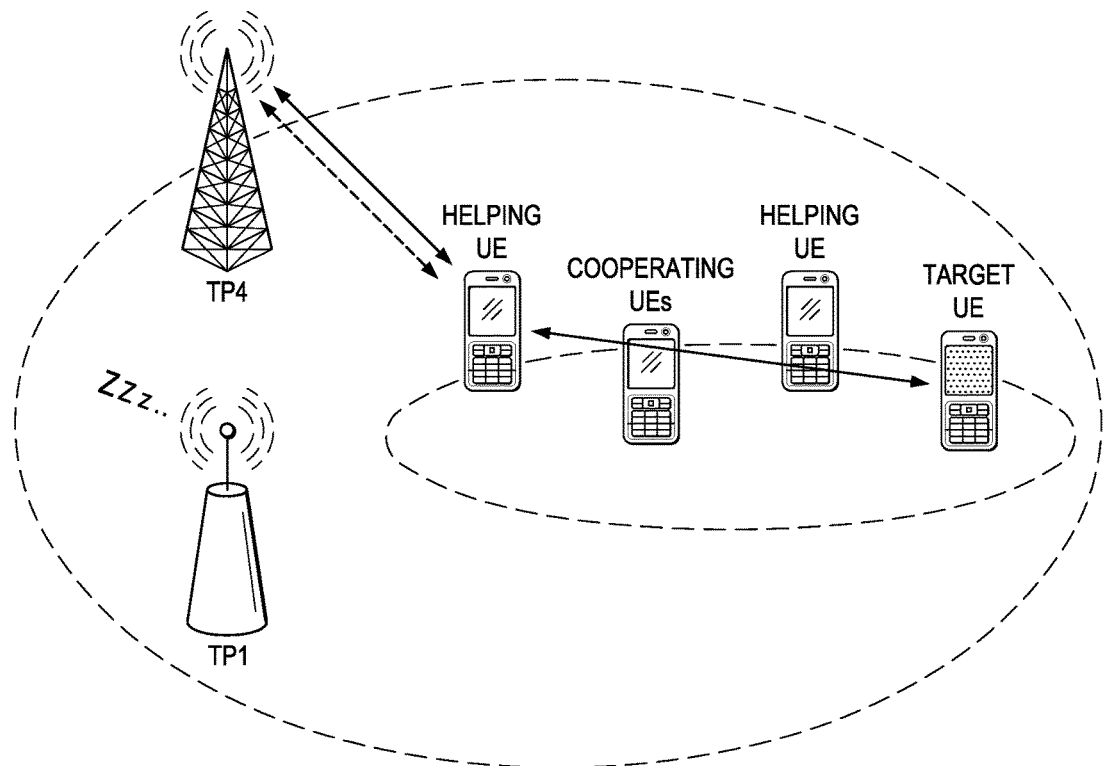
Figure 9C:
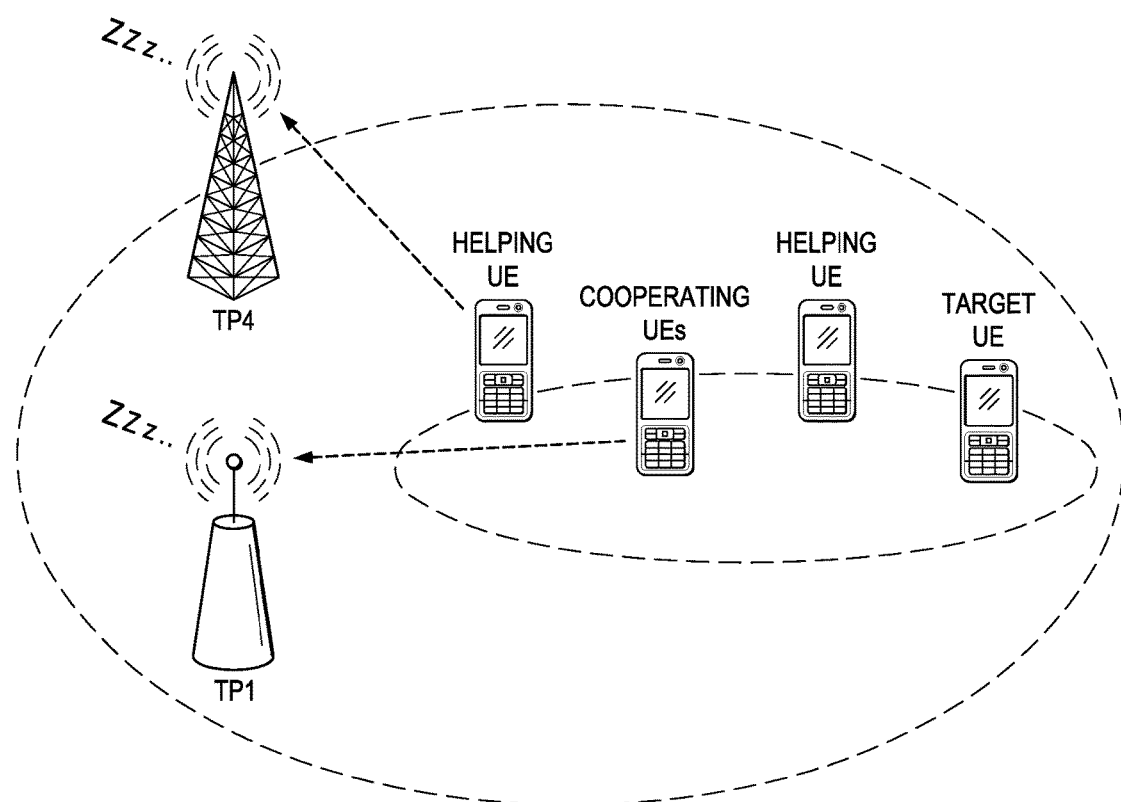

Aspects of this disclosure provide different sleep/wake-up mechanisms for downlink and uplink. FIGS. 9A-9C illustrate network configurations for different downlink and uplink wake-up procedures. In some embodiments, the uplink wake up procedure may be periodic to maintain uplink based measurements, such as UE/TP association map. Embodiments may use uplink sounding reference signals (SRS) or uplink signaling carried in the physical uplink control channel (PUCCH) to detect active UEs. The uplink SRS and/or uplink signals may be transmitted by a target UE, or by a helping UE in D2D communication with the target UE. Detection of active UEs may also be performed by monitoring a physical random access control channel (PRACH). Upon detecting active UEs, the transmit point may be woken up. Measured uplink signals may originate from the selected helping UE(s) of the target UE where UE cooperation is enabled. Wake-up period can be configured by the network.

In some embodiments, wake-up procedures can be event-triggered based on a UE feeding back a change in downlink background interference power.

Embodiments may use on-demand event-triggered based wake-up in the downlink. The triggering event may be based on the optimization result of the joint data and control traffic offloading. Embodiments may provide periodic wake up in the downlink for periodic traffic such as VoIP. In some embodiments, subsets of a transmit point (TP) group may periodically wake-up to send synchronization and broadcast signals in the downlink direction.

FIG. 6 illustrates an embodiment network architecture for disabling downlink and uplink operations independently via radio access network (RAN) virtualization. Embodiments may provide support for offloading both control and data traffic. Some embodiments may offload UE-specific control channel communications as well. In some embodiments, downlink grant and other downlink centric control signaling is turned on/off with (or independently from) the data. In some embodiments, downlink and uplink operations are muted independently from one another. In some embodiments, uplink transmit point sets include different transmit points than transmit point sets for DL:

To enable independent muting, uplink grant (and also uplink ACK/NACK PHICH) may be provisioned. The uplink grant provisioning may affect the final decision on downlink muting.

Embodiments may use offloading criteria to ensure that the UE observes an active transmit point for receiving downlink control signals. Different traffic offloading strategies may be employed for uplink and downlink. Offloading strategies may consider data load and control load, possibly on different time scales. Offloading criteria may consider both data and control signals when determining load. Activated transmit points can transmit any ratio of data to control traffic. Control channel offloading may be less dynamic than data channel offloading in some embodiments. In embodiments, uplink communications may be grant-less in nature, e.g., single carrier multiple access, grant-less multiple access, etc. When uplink communications are grant-less, downlink muting and uplink grant decisions may be performed jointly. For example, an uplink grant may be sent prior to uplink transmission (e.g., between three and four TTIs depending on various parameters) for the grant to be received/processed prior to uplink transmission. Embodiments may use offloading criteria to ensure that the UE observes an awake transmit point for receiving uplink grants. Along with other downlink control information, a UE may receive uplink grants from a transmit point that is different than the transmit point transmitting the UE's data channel. In embodiments, a controller may be configured to maximize a combined downlink utility function. The following is an example of a downlink utility function: $U=\Sigma_{k,n} U_{k,n}+\Sigma_{k,n}C_{k,n}+c\Sigma_i f(u_i,\sigma_i) P_i$, where $\Sigma_i f(u_i, \sigma_i) P_i$ is the muting incentive (or activation penalty), $u_i$ is the data loading ratio, $\sigma_i$ is the control loading ratio, c is the energy saving coefficient, $P_i$ is the normalized transmit point power savings, $U_{k,n}$ is the data utility of $UE_k$ on resource$_n$, and $C_{k,n}$ is the control utility of $UE_k$ on resource$_n$. FIG. 7 illustrates a graph of consumed power versus output power of a transmit point operating in a sleep mode, an active mode, and a max power mode.

In an embodiment, a network controller operates on a group of transmit points, which may be a cluster or a candidate set specified by the network layer. A Joint Wideband Muting and Dynamic Point Selection algorithm may be employed by the network controller to analyze the data portion of traffic. BSs with no scheduled UEs will be transitioned to a 'sleep mode,' and their power consumption may be reduced. In embodiments, the algorithm could maximize the following utility function: $U=\Sigma_{k,n} U_{k,n}+c\Sigma_{i\in Muted}(1-u_i)P_i$, where $u_i$ is the data loading ratio, c is the energy saving coefficient, and $P_i$ is the normalized transmit point power savings. FIG. 8 illustrates a graph depicting a system capacity analysis for target constant bit rate of one megabyte per second (Mbps).

Embodiment techniques for power reduction may be versatile. For example, the techniques may be capable of dynamically adapting to offered traffic loads, of offloading both data and control traffic, of controlling downlink and uplink operations independently, and of increasing user satisfaction by exploiting the tradeoffs between spectral efficiency, bandwidth, and latency.

Figure 10:
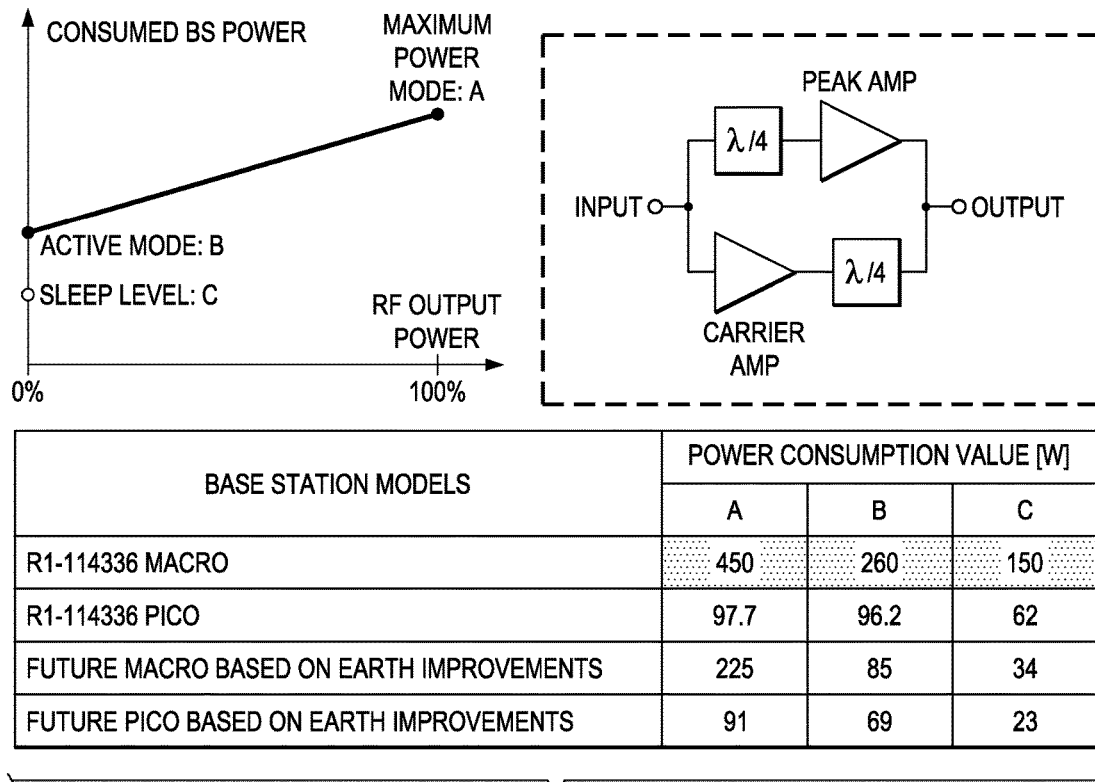
FIG. 10 illustrates a diagram, graph, and chart of a load dependent power consumption model.

FIG. 9 illustrates a diagram of a power consumption model discussed in IEEE Wireless Communications article entitled "How much energy is needed to run a wireless network?", IEEE Wireless Communications," which is incorporated by reference herein as if reproduced in its entirety. FIG. 10 illustrates a diagram, a graph, and a chart of a load dependent power consumption model for base stations. In this model, the radio frequency output powers of the macro and pico base stations are forty watts and one watt, respectively.

Figure 11:
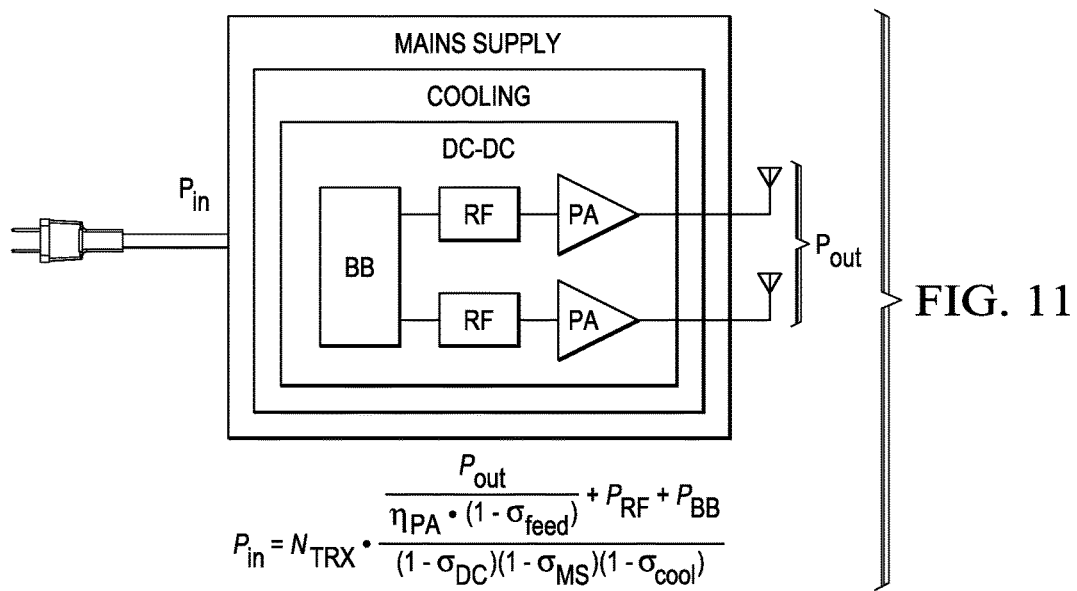
FIG. 11 illustrates a diagram of a power consumption model.
Figure 12:
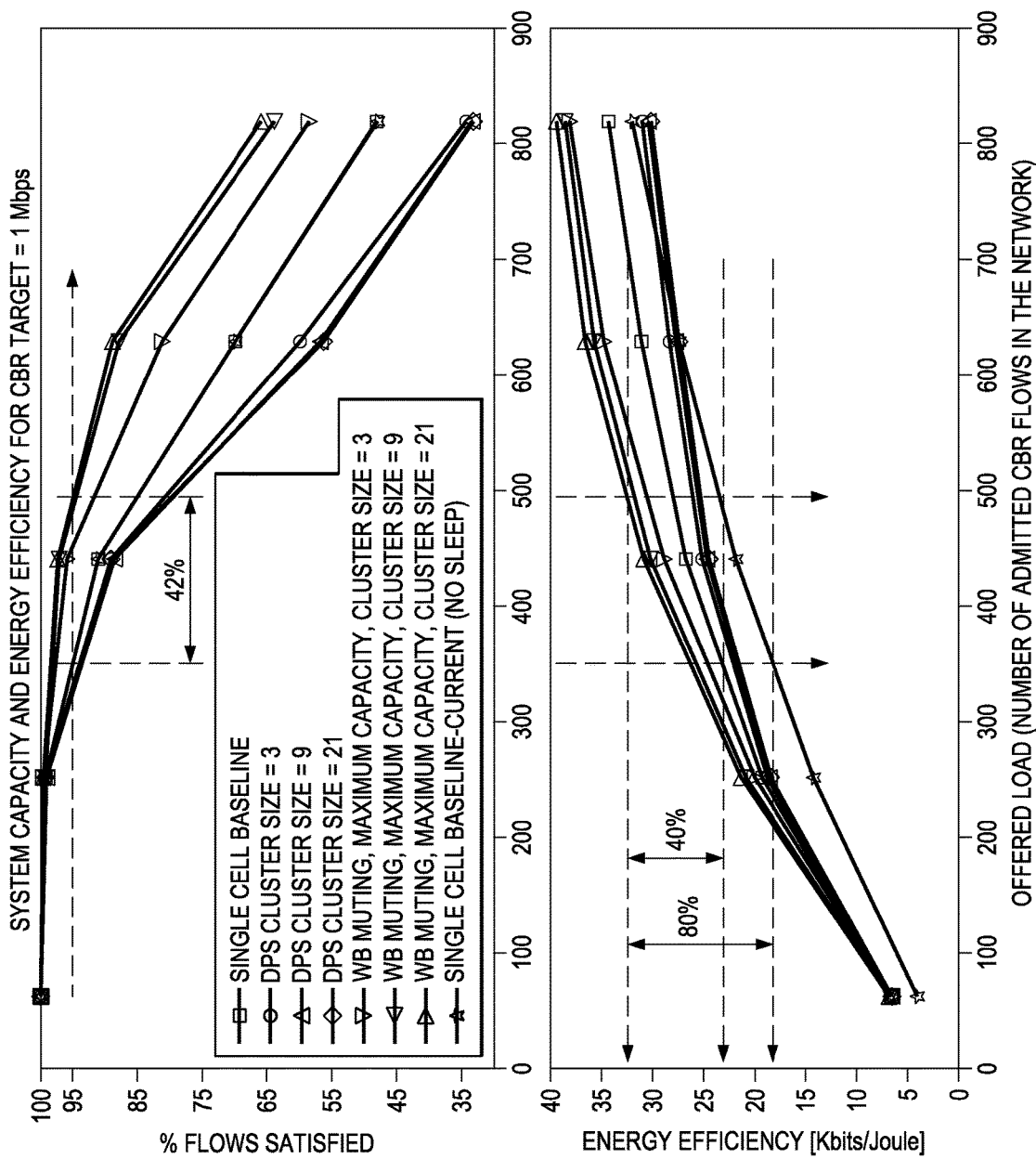
FIG. 12 illustrates a graph of a system capacity analysis.

FIG. 11 illustrates a diagram of a power consumption model discussed in IEEE Wireless Communications article entitled "How much energy is needed to run a wireless network?", IEEE Wireless Communications," which is incorporated by reference herein as if reproduced in its entirety. FIG. 12 illustrates graphs depicting a system capacity analysis for target constant bit rate of one megabyte per second (Mbps) for state of the art base stations.

Figure 13:
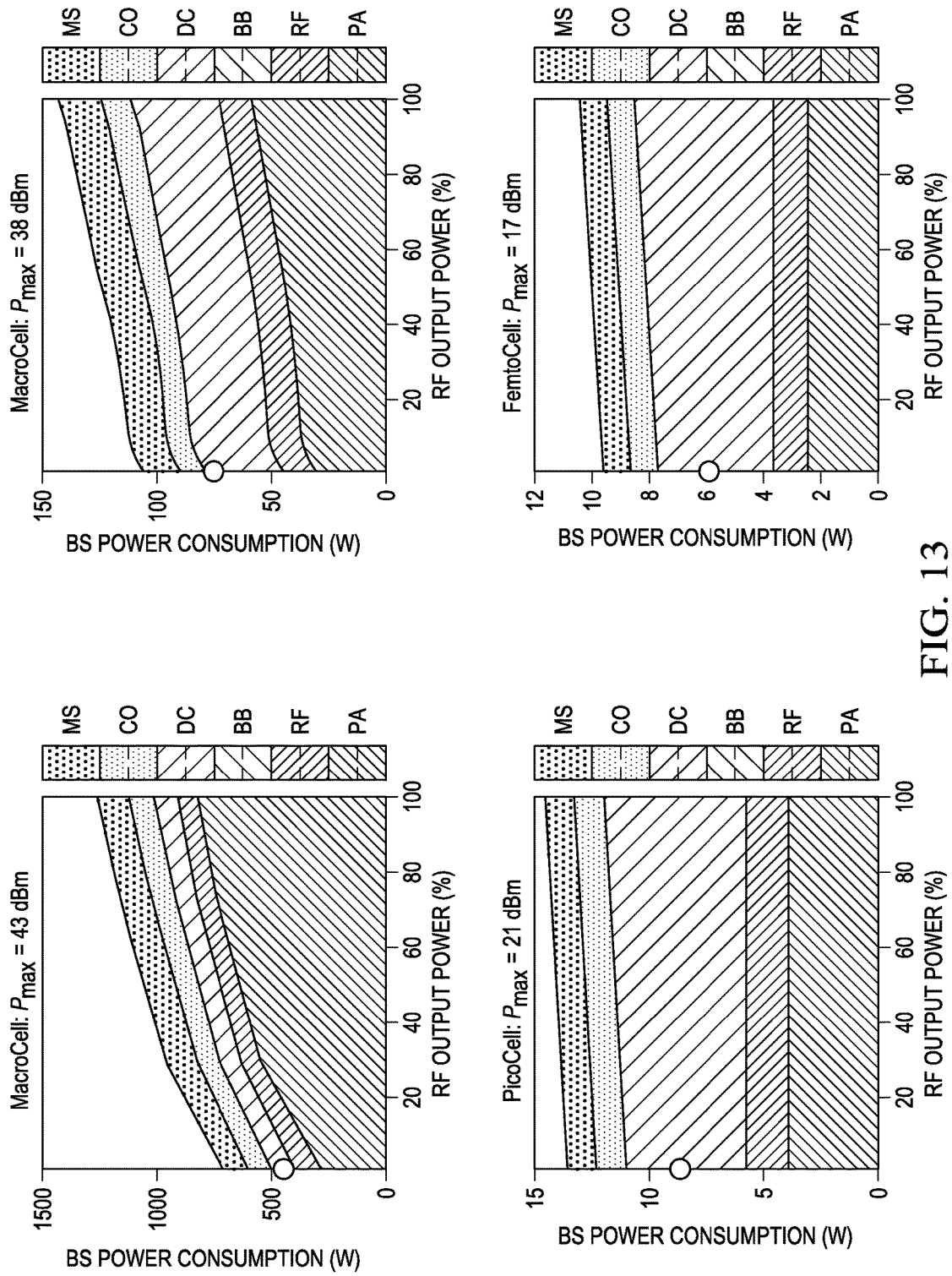
FIG. 13 graphs of a power consumption model.
Figure 14A:
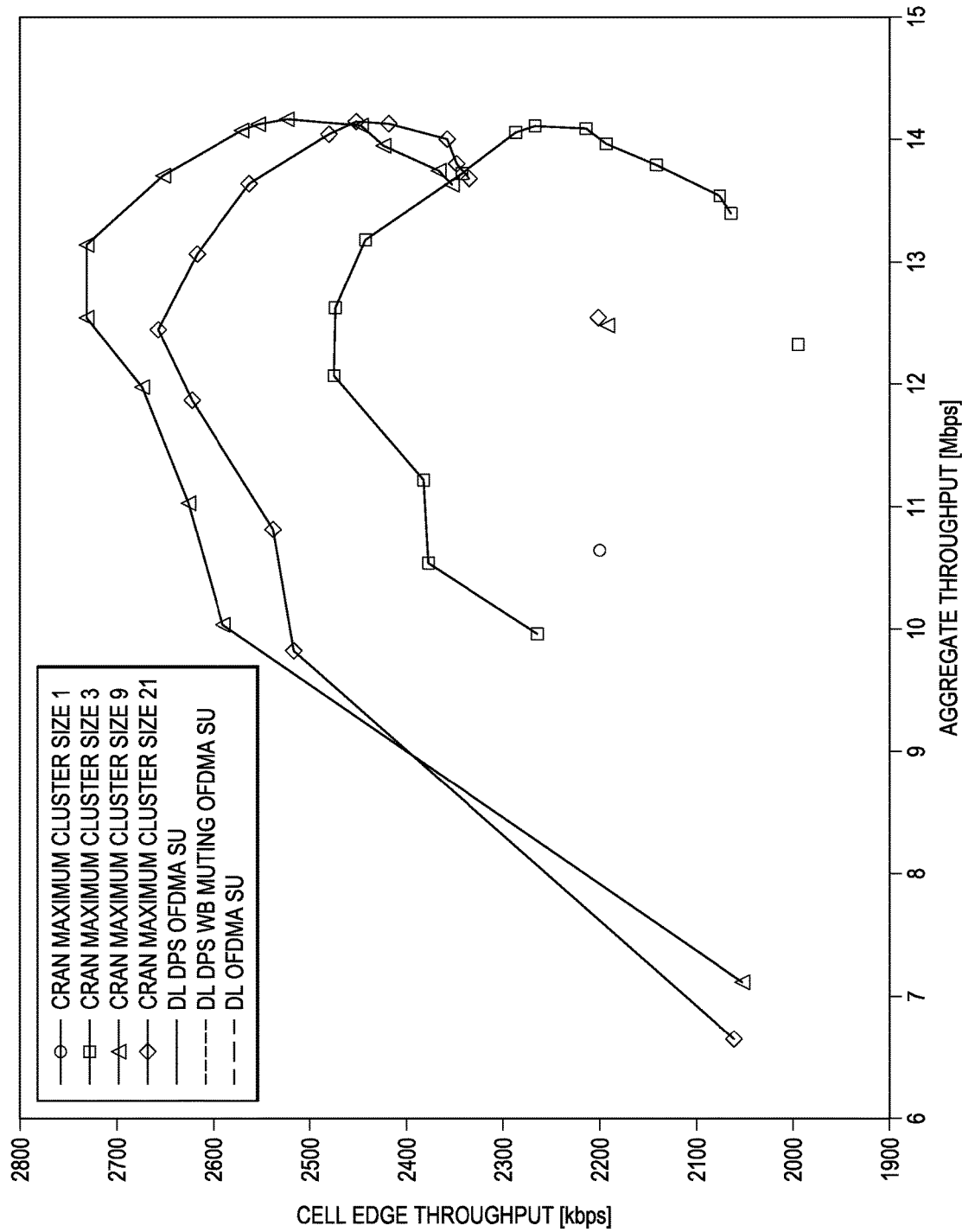
FIGS. 14A-14C illustrate graphs of throughput simulations for embodiment power reduction techniques.
Figure 14B:
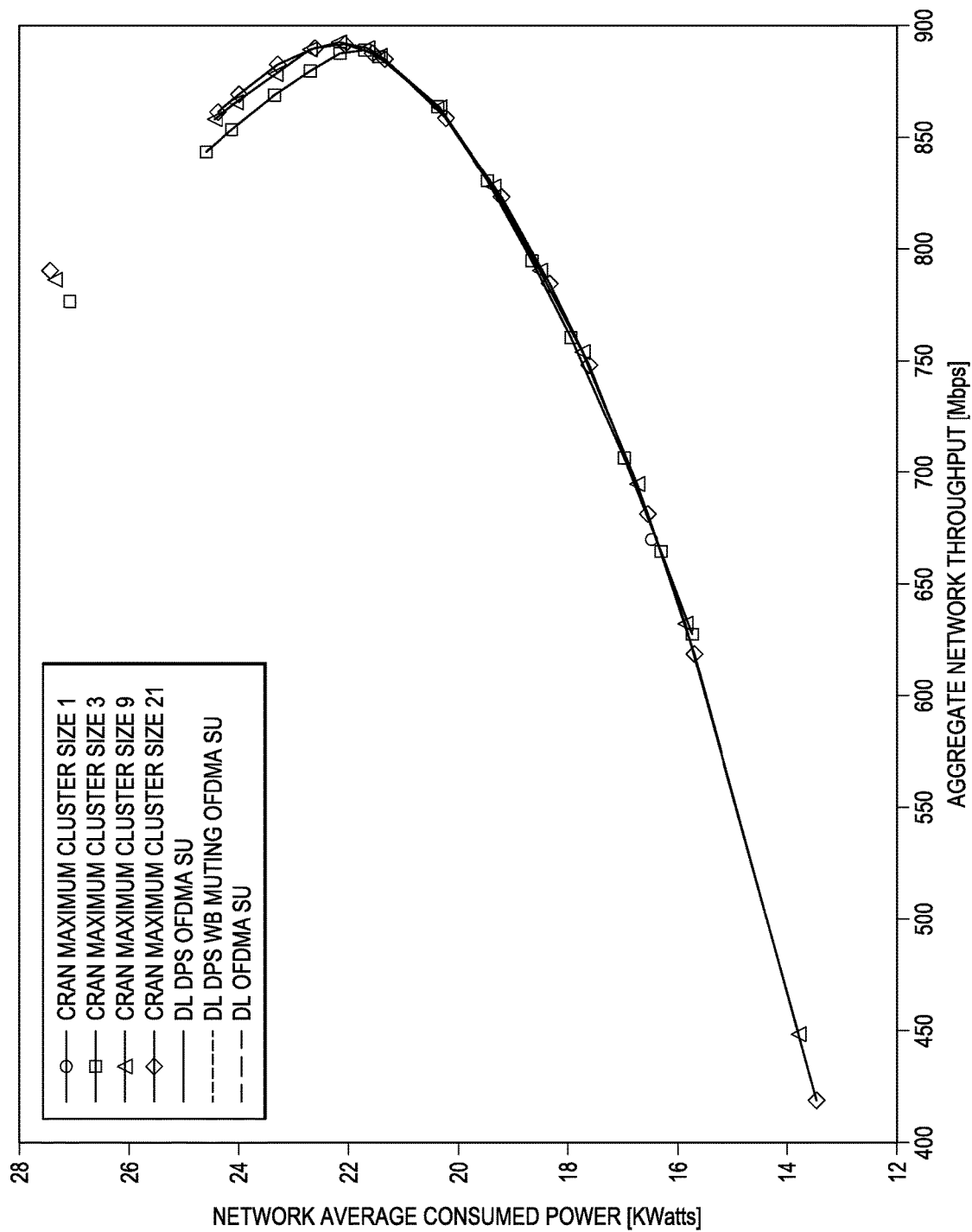
Figure 14C:
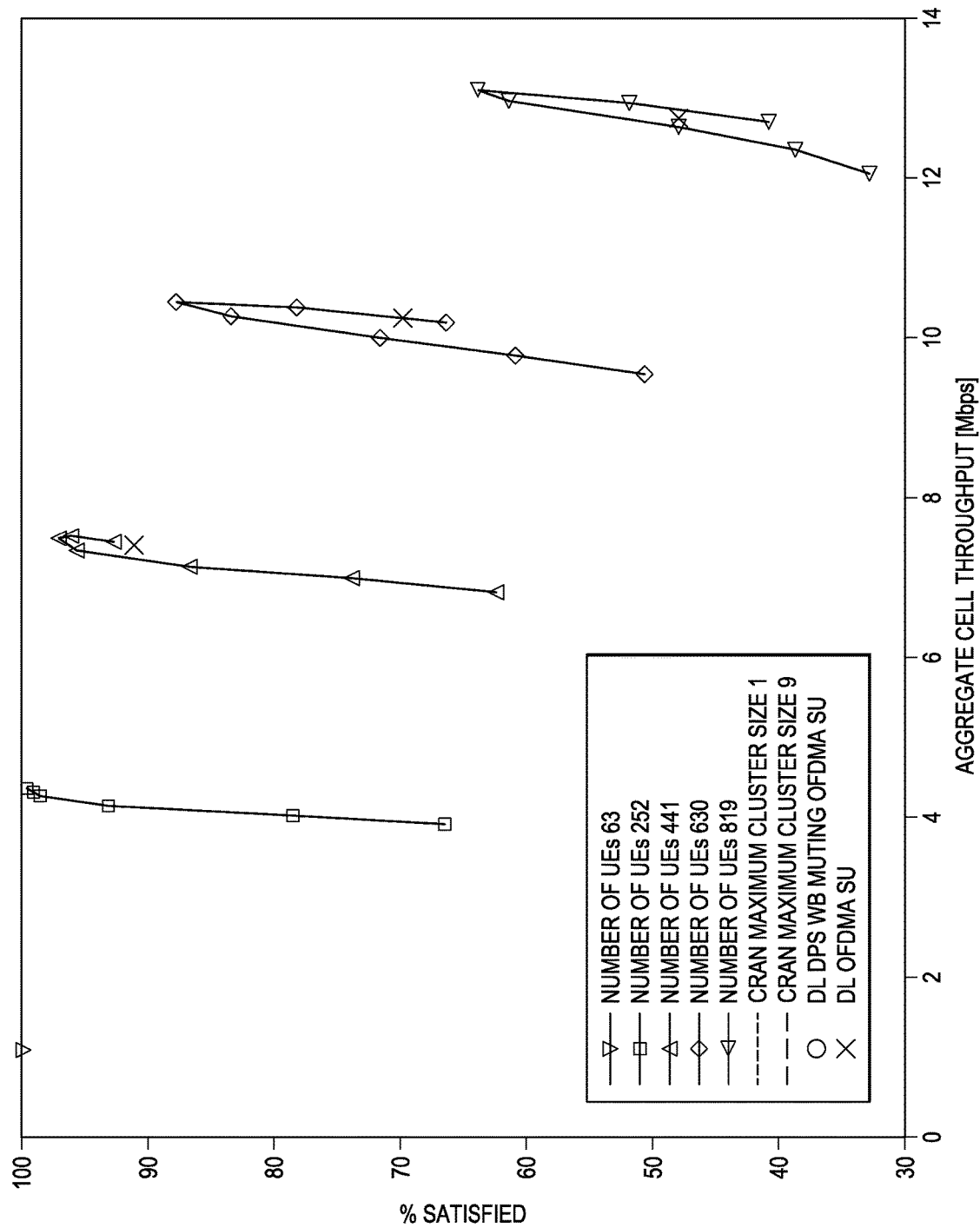
Figure 15:
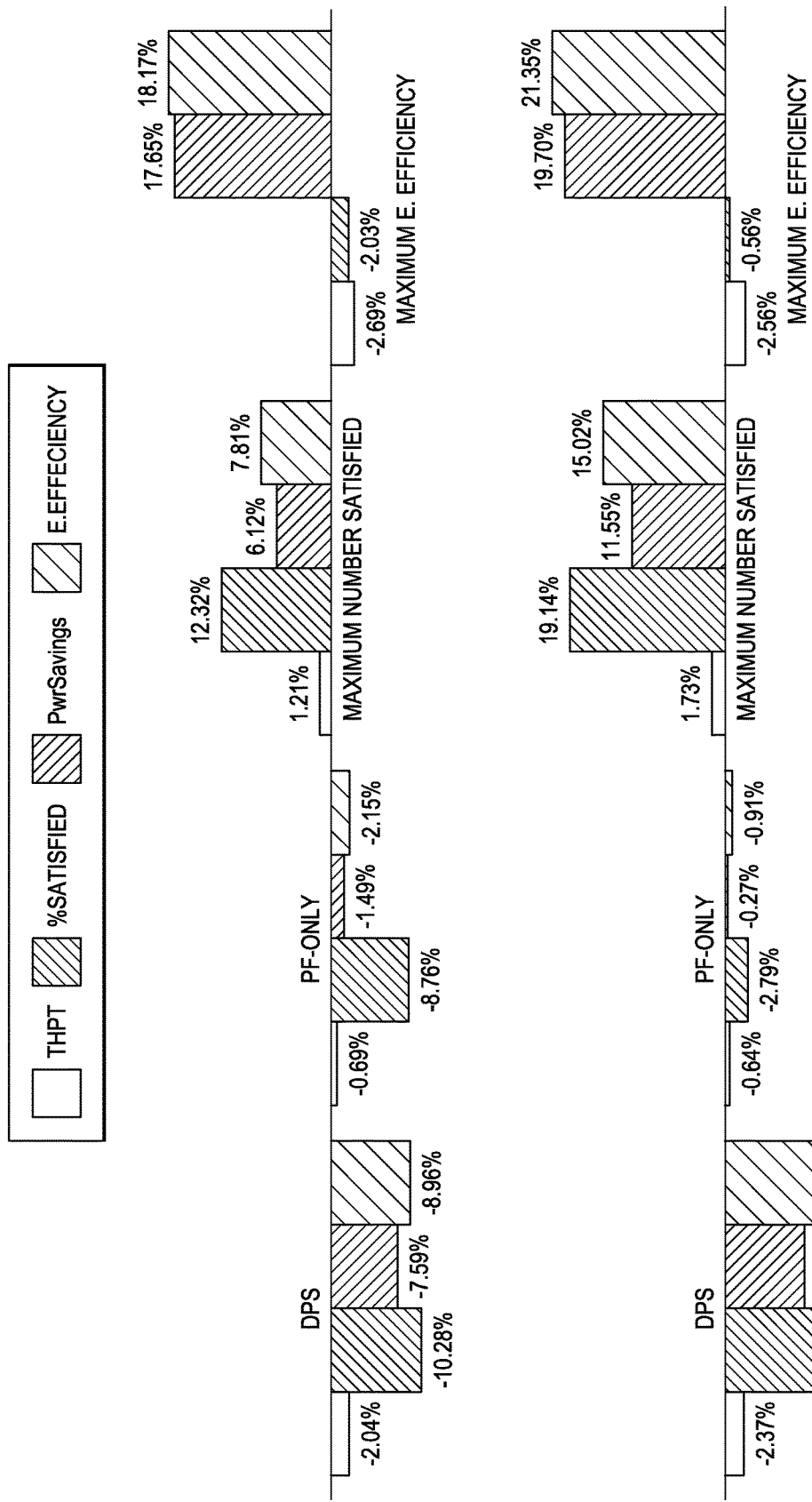
FIG. 15 illustrates a chart of simulation scenario results.

FIG. 13 illustrates graphs of the power consumption model depicted in FIG. 12. FIGS. 14A-14C illustrate throughput simulations for embodiment techniques of this disclosure. The simulations were created using the following Common Simulation Parameters: CRAN cluster size: 1, 3, 9, and 21 cells; SU MIMO 2×2; Transmit diversity; Maximum transmit base station transmit power of forty watts; Linear model for electrical power consumption using Matlab post-processor (For all schemes, any BS with no scheduled UE, will be considered in a 'sleep mode' and its power consumption will be reduced); B=10 MHz; 10 RBGs; 5 RBs/RBG; Perfect CQI; OLLA wideband fixed. The simulations were created in accordance with the following scenarios: 630 UEs under regular loading; 236 UEs under light loading (⅓ of regular population); UE dropping (based on geometry) both uniform and non-uniform with randomized pattern (In each 3-cell site, one cell is randomly chosen to be the one with the highest density); UE Receiver configured for MMSE; Traffic model was Full buffer with CBR emulation; Simulated Schemes include single cell SU-MIMO; DPS SU-MIMO; Joint Wideband Muting and DPS SU-MIMO; Energy Saving Coefficient of zero (PF-only utility) and {0.1, 0.3, 0.5, 0.7, 0.9, 1, 1.5, 2, 2.5, 3, 4, 5, 10} (Energy-aware muting incentive/turning-on penalty). FIG. 15 illustrates a chart of simulation scenario results.

Figure 16:
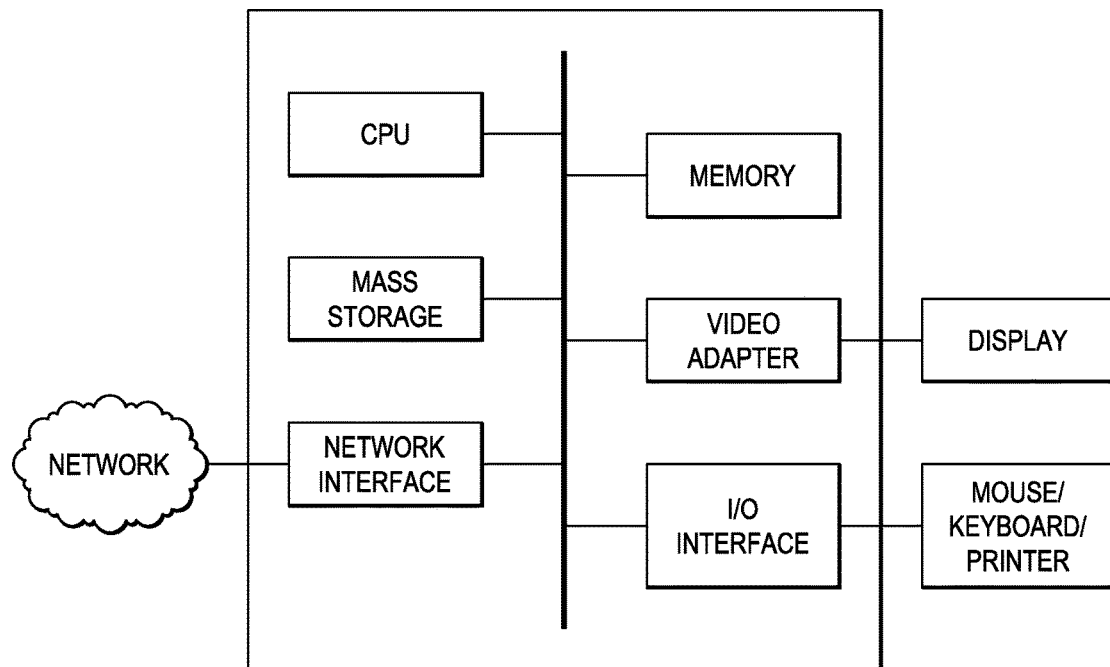
FIG. 16 illustrates a diagram of an embodiment computing platform.

FIG. 16 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 17:
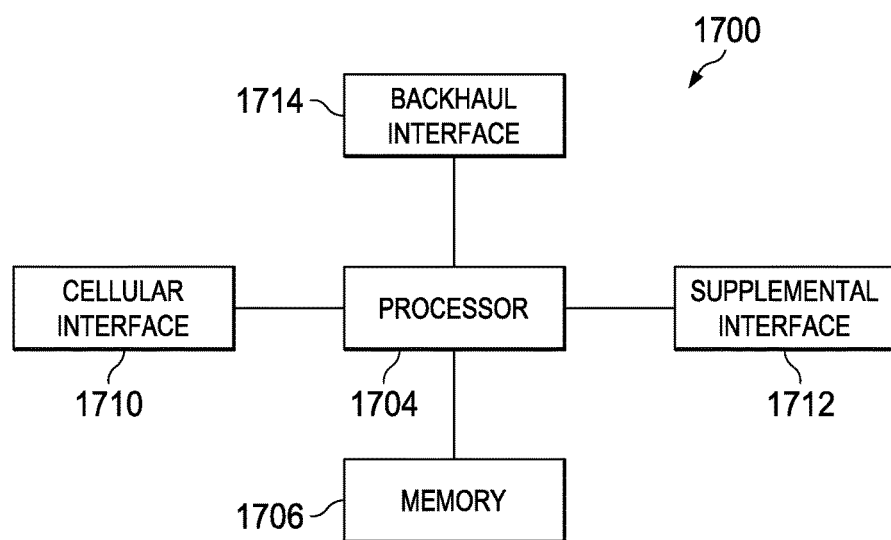
FIG. 17 illustrates a diagram of an embodiment communications device.

FIG. 17 illustrates a block diagram of an embodiment of a communications device 1700, which may be equivalent to one or more devices (e.g., UEs, NBs, etc.) discussed above. The communications device 1700 may include a processor 1704, a memory 1706, a plurality of interfaces 1710, 1712, 1714, which may (or may not) be arranged as shown in FIG. 17. The processor 1704 may be any component capable of performing computations and/or other processing related tasks, and the memory 1706 may be any component capable of storing programming and/or instructions for the processor 1704. The interfaces 1710, 1712, 1714 may be any component or collection of components that allows the communications device 1700 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for offloading traffic between physical transmit points (TPs) of a virtual TP in a wireless communications network, the method comprising:
   identifying, by a network controller, a virtual TP serving a user equipment (UE), the virtual TP including at least a first physical TP and a second physical TP, wherein the first physical TP communicates one or both of data traffic and control signaling with the UE during a first period; and
   offloading at least one of the data traffic and the control signaling from the first physical TP to the second physical TP without causing the UE to undertake a handover, wherein the second physical TP communicates the at least one of the data traffic or the control signaling with the UE during a second period.

2. The method of claim 1, wherein offloading at least one of the data traffic and the control signaling from the first physical TP to the second physical TP comprises:
   offloading at least one of the data traffic and the control signaling from the first physical TP to the second physical TP for a time period on the order of a Transmission Time Interval (TTI).

3. The method of claim 1, wherein identifying the virtual TP serving the UE includes:
   selecting the virtual TP for strategic offloading between physical TPs of the virtual TP.

4. The method of claim 3, wherein selecting the virtual TP for strategic offloading between physical TPs of the virtual TP comprises:
   selecting the virtual TP for the strategic offloading in accordance with a traffic level of the virtual TP.

5. The method of claim 4, wherein selecting the virtual TP for the strategic offloading in accordance with the traffic level of the virtual TP comprises:
   comparing the traffic level of the virtual TP with traffic levels of other TPs in the wireless communications network.

6. The method of claim 3, wherein selecting the virtual TP for strategic offloading between physical TPs of the virtual TP comprises:
selecting the virtual TP for the strategic offloading in accordance with a power consumption of the virtual TP.

7. The method of claim 1, wherein offloading the at least one of the data traffic and the control signaling from the first physical TP to the second physical TP comprises:
offloading downlink control signaling from the first physical TP to the second physical TP.

8. The method of claim 7, further comprising:
downlink muting the first physical TP after offloading the downlink control signaling to the second physical TP.

9. The method of claim 7, wherein the first physical TP comprises a macro base station and the second physical TP comprises a low power node, and wherein the method further comprises:
downlink muting the macro base station after offloading the downlink control signaling from the macro base station to the low power node.

10. The method of claim 1, wherein offloading at least one of the data traffic and the control signaling from the first physical TP to the second physical TP comprises:
offloading downlink data traffic from the first physical TP to the second physical TP.

11. The method of claim 1, wherein offloading at least one of the data traffic and the control signaling from the first physical TP to the second physical TP comprises:
offloading uplink data traffic from the first physical TP to the second physical TP.

12. The method of claim 1, wherein offloading at least one of the data traffic and the control signaling from the first physical TP to the second physical TP comprises:
offloading uplink control signaling from the first physical TP to the second physical TP.

13. The method of claim 1, wherein the offloaded control signaling includes UE-specific control traffic.

14. The method of claim 1, further comprising:
identifying a third physical TP having data traffic that can be offloaded to another TP in the wireless communications network.

15. The method of claim 14 further including offloading one of uplink (UL) data traffic and downlink (DL) data traffic from the third physical TP to another TP without offloading the other one of the UL traffic and the DL traffic.

16. The method of claim 14 further including offloading both uplink (UL) data traffic and downlink (DL) data traffic from the third physical TP to another TP.

17. A network controller comprising:
a processor; and
a computer readable storage medium storing programming for execution by the processor, the programming including instructions to:
identify a virtual transmit point (TP) serving a user equipment (UE), the virtual TP including at least a first physical TP and a second physical TP, wherein the first physical TP communicates one or both of data traffic and control signaling with the UE during a first period; and
offload at least one of the data traffic and the control signaling from the first physical TP to the second physical TP without causing the UE to undertake a handover,
wherein the second physical TP communicates the at least one of the data traffic or the control signaling with the UE during a second period.

18. A method for muting, the method comprising:
deactivating a downlink transmitter of a physical transmit point (TP) without deactivating an uplink receiver of the physical TP;
monitoring, by the physical TP, uplink feedback signals via the uplink receiver while the downlink transmitter of the physical TP is deactivated; and
reactivating the downlink transmitter of the physical TP when at least one of the uplink feedback signals satisfies a downlink re-activation criteria.

19. The method of claim 18, further comprising:
determining, by the physical TP, that a downlink transmission for a target user equipment (UE) has been offloaded from a second TP to the physical TP, wherein the physical TP and the second TP are associated with the same virtual TP; and
performing the downlink transmission to the target UE using the downlink transmitter.

20. The method of claim 18, wherein a corresponding one of the uplink feedback signals satisfies the downlink re-activation criteria when the corresponding uplink feedback signal indicates that an interference level experienced by a target user equipment (UE) exceeds a threshold.

21. The method of claim 20, wherein the interference level experienced by the target UE comprises a background interference level experienced by the target UE.

22. The method of claim 20, wherein the uplink feedback signal is communicated by the target UE.

23. The method of claim 20, wherein the uplink feedback signals are communicated by a helping UE that is engaged in device-to-device (D2D) communications with the target UE.

24. The physical TP of claim 18, wherein a corresponding one of the uplink feedback signals satisfies the downlink re-activation criteria when the corresponding uplink feedback signal indicates that an interference level experienced by a target user equipment (UE) exceeds a threshold.

25. A physical transmit point (TP) comprising:
a processor; and
a computer readable storage medium storing programming for execution by the processor, the programming including instructions to:
deactivate a downlink transmitter of the physical TP without deactivating an uplink receiver of the physical TP;
monitor uplink feedback signals via the uplink receiver while the downlink transmitter of the physical TP is deactivated; and
reactivate the downlink transmitter of the physical TP when at least one of the uplink feedback signals satisfies a downlink re-activation criteria.

* * * * *